United States Patent
Tokioka et al.

(10) Patent No.: US 10,893,188 B2
(45) Date of Patent: Jan. 12, 2021

(54) IMAGING APPARATUS HAVING AUTOFOCUS FUNCTION, AND FOCUS ADJUSTMENT METHOD THEREFOR

(71) Applicant: CANON KABUSHIKI KAISHA, Tokyo (JP)

(72) Inventors: Masaki Tokioka, Fujisawa (JP); Hiromi Kotoku, Tokyo (JP); Hidetoshi Abe, Tokyo (JP); Takeshi Omata, Sagamihara (JP); Kenya Fukabori, Tokyo (JP); Naoki Iwasaki, Kawasaki (JP); Hiroaki Kurisu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 16/257,370

(22) Filed: Jan. 25, 2019

(65) Prior Publication Data

US 2019/0238756 A1  Aug. 1, 2019

(30) Foreign Application Priority Data

Jan. 31, 2018 (JP) ................................ 2018-015455

(51) Int. Cl.
*H04N 5/232* (2006.01)
*H04N 5/235* (2006.01)

(52) U.S. Cl.
CPC ..... *H04N 5/232122* (2018.08); *H04N 5/2353* (2013.01); *H04N 5/232121* (2018.08); *H04N 5/232125* (2018.08)

(58) Field of Classification Search
CPC .... H04N 5/235; H04N 5/2352; H04N 5/2353; H04N 5/238; H04N 5/23212;
(Continued)

(56) References Cited

U.S. PATENT DOCUMENTS 9,083,878 B2 * 7/2015 Kikuchi ............. H04N 5/23212
10,116,856 B2 * 10/2018 Kikuchi ................. G03B 13/36

FOREIGN PATENT DOCUMENTS

| JP | 2001083407 A |   | 3/2001 |
| JP | 2005352043 A | * | 12/2005 |
| JP | 2008096796 A |   | 4/2008 |

OTHER PUBLICATIONS

Machine English Translation of JP 2005-352043 A, Dec. 22, 2005 (Year: 2005).*

* cited by examiner

*Primary Examiner* — Nelson D. Hernández Hernández
(74) *Attorney, Agent, or Firm* — Rossi, Kimms & McDowell LLP

(57) ABSTRACT

An imaging apparatus includes an imaging device that photoelectrically converts an optical image obtained through a focus lens. The focus lens is moved to a focus position set by focus detection performed based on image signals from the imaging device with a first aperture value. A first correction amount of the set focus position is acquired according to a difference between the first aperture value and a second aperture value to be used at a time of photographing. Photographing is executed at a determined focus position at the time of photographing, by a user's operation. If the first correction amount is larger than a predetermined amount, a focus position corrected according to the first correction amount is determined as the focus position at the time of photographing, and if not, the set focus position is determined as the focus position at the time of photographing.

18 Claims, 25 Drawing Sheets

(58) Field of Classification Search
CPC ....... H04N 5/232123; H04N 5/232121; H04N 5/232125; G03B 13/00; G03B 13/36
See application file for complete search history.

*FIG. 3A*

| OBJECT DISTANCE (mm) → | FOCUS CORRECTION AMOUNT (μm) WHEN F VALUE IS CHANGED FROM OPEN (F2.8) TO F4 | | | | | | | | |
|---|---|---|---|---|---|---|---|---|---|
| | INFINITY | 1380 | 680 | 453 | 340 | 272 | 226 | 194 | 175 |
| Zoom0 | 41.6 | 24.6 | 6.2 | -13.0 | -33.2 | -54.3 | -76.4 | -99.4 | -117.3 |
| Zoom1 | 41.5 | 28.1 | 12.9 | -2.6 | -18.9 | -36.1 | -54.2 | -73.4 | |
| Zoom2 | 36.1 | 24.8 | 14.2 | 2.4 | -10.1 | -23.3 | -37.4 | | |
| Zoom3 | 31.1 | 21.5 | 13.3 | 4.5 | -4.1 | -13.0 | -22.2 | | |
| Zoom4 | 23.3 | 16.9 | 12.2 | 7.1 | 2.6 | -1.9 | | | |
| Zoom5 | 17.8 | 11.9 | 10.7 | 8.1 | 6.3 | 4.8 | | | |
| Zoom6 | 16.3 | 12.0 | 10.2 | 8.5 | 8.2 | 8.2 | | | |
| Zoom7 | 16.2 | 12.2 | 11.2 | 10.6 | 11.7 | 13.4 | | | |
| Zoom8 | 15.6 | 12.6 | 12.8 | 13.4 | 16.0 | 19.3 | | | |
| Zoom9 | 15.4 | 12.7 | 13.6 | 15.4 | 19.6 | 24.8 | | | |
| Zoom10 | 12.6 | 14.1 | 18.1 | 21.6 | 26.3 | | | | |
| Zoom11 | 9.5 | 14.9 | 22.0 | 27.5 | 33.5 | | | | |
| Zoom12 | 14.0 | 13.9 | 19.4 | 27.3 | 39.5 | | | | |
| Zoom13 | 13.7 | 15.6 | 22.3 | 33.1 | 49.1 | | | | |
| Zoom14 | 13.2 | 15.9 | 25.0 | 38.5 | 58.4 | | | | |
| Zoom15 | 12.1 | 16.1 | 27.8 | 43.8 | 66.6 | | | | |
| Zoom16 | 10.1 | 17.6 | 32.4 | 50.6 | | | | | |
| Zoom17 | 2.8 | 14.2 | 30.6 | 49.8 | | | | | |
| Zoom18 | -4.1 | 10.5 | 26.5 | 43.2 | | | | | |
| Zoom19 | -7.8 | 9.5 | 27.0 | 44.0 | | | | | |
| Zoom20 | -11.5 | 5.7 | 22.4 | 38.1 | | | | | |
| Zoom21 | -16.0 | -1.3 | 13.7 | 28.3 | | | | | |

FIG. 3B

| OBJECT DISTANCE (mm) → | FOCUS CORRECTION AMOUNT (μm) WHEN F VALUE IS CHANGED FROM OPEN (F2.8) TO F8 | | | | | | | | | |
|---|---|---|---|---|---|---|---|---|---|---|
| | INFINITY | 1380 | 680 | 453 | 340 | 272 | 226 | 194 | 175 | |
| Zoom0 | 5.7 | -17.4 | -42.4 | -68.5 | -95.8 | -124.6 | -154.6 | -186.0 | -210.3 | |
| Zoom1 | 12.9 | -9.7 | -34.4 | -59.8 | -86.5 | -114.4 | -143.5 | -174.0 | | |
| Zoom2 | 16.6 | -6.7 | -30.8 | -55.7 | -82.2 | -109.6 | -138.1 | | | |
| Zoom3 | 20.1 | -3.7 | -27.9 | -52.6 | -79.0 | -105.8 | -133.7 | | | |
| Zoom4 | 24.0 | -0.3 | -24.9 | -49.7 | -76.6 | -103.6 | | | | |
| Zoom5 | 28.4 | 2.3 | -22.2 | -47.5 | -75.0 | -102.3 | | | | |
| Zoom6 | 33.8 | 7.1 | -19.5 | -45.4 | -73.9 | -101.7 | | | | |
| Zoom7 | 38.3 | 10.5 | -16.8 | -43.1 | -72.3 | -100.6 | | | | |
| Zoom8 | 43.1 | 14.6 | -13.5 | -40.3 | -70.7 | -100.0 | | | | |
| Zoom9 | 48.3 | 18.2 | -11.3 | -38.9 | -70.7 | -100.8 | | | | |
| Zoom10 | 53.3 | 22.1 | -8.7 | -37.4 | -71.6 | | | | | |
| Zoom11 | 56.8 | 24.5 | -7.3 | -36.4 | -72.1 | | | | | |
| Zoom12 | 61.9 | 26.6 | -7.4 | -37.2 | -74.2 | | | | | |
| Zoom13 | 65.5 | 28.5 | -8.2 | -38.6 | -77.5 | | | | | |
| Zoom14 | 67.9 | 28.2 | -10.3 | -41.4 | -82.6 | | | | | |
| Zoom15 | 68.6 | 27.0 | -12.6 | -44.2 | -88.2 | | | | | |
| Zoom16 | 68.6 | 23.1 | -20.4 | -54.9 | | | | | | |
| Zoom17 | 62.1 | 12.6 | -36.9 | -78.3 | | | | | | |
| Zoom18 | 54.6 | -0.1 | -58.1 | -111.3 | | | | | | |
| Zoom19 | 47.1 | -14.5 | -79.6 | -143.0 | | | | | | |
| Zoom20 | 39.6 | -36.1 | -114.0 | -192.5 | | | | | | |
| Zoom21 | 25.8 | -65.4 | -155.5 | -247.6 | | | | | | |

FIG. 3C

| OBJECT DISTANCE (mm)→ | FOCUS CORRECTION AMOUNT (μm) WHEN F VALUE IS CHANGED FROM OPEN (F2.8) TO F16 | | | | | | | | |
|---|---|---|---|---|---|---|---|---|---|
| | INFINITY | 1380 | 680 | 453 | 340 | 272 | 226 | 194 | 175 |
| Zoom0 | 158.0 | 136.5 | 112.8 | 87.9 | 64.8 | 39.1 | 3.8 | −16.0 | −51.7 |
| Zoom1 | 164.5 | 142.0 | 117.5 | 92.2 | 64.7 | 37.2 | 8.7 | −21.7 | |
| Zoom2 | 167.4 | 143.8 | 118.4 | 92.2 | 63.7 | 34.1 | 7.0 | | |
| Zoom3 | 169.8 | 145.4 | 119.3 | 92.6 | 62.2 | 31.1 | 6.2 | | |
| Zoom4 | 173.1 | 147.3 | 119.7 | 91.5 | 59.5 | 26.0 | | | |
| Zoom5 | 178.5 | 150.0 | 119.8 | 89.2 | 55.4 | 19.1 | | | |
| Zoom6 | 182.4 | 151.7 | 119.3 | 86.6 | 47.6 | 9.6 | | | |
| Zoom7 | 189.5 | 155.6 | 120.2 | 84.7 | 39.6 | −0.1 | | | |
| Zoom8 | 192.1 | 156.9 | 119.7 | 82.1 | 31.8 | −17.9 | | | |
| Zoom9 | 198.7 | 159.1 | 117.6 | 76.1 | 16.8 | −39.3 | | | |
| Zoom10 | 206.7 | 163.6 | 118.2 | 72.2 | 3.4 | | | | |
| Zoom11 | 210.4 | 164.8 | 116.5 | 67.5 | −9.5 | | | | |
| Zoom12 | 217.3 | 166.9 | 113.7 | 59.9 | −34.1 | | | | |
| Zoom13 | 223.2 | 167.4 | 108.7 | 49.6 | −62.6 | | | | |
| Zoom14 | 229.3 | 167.5 | 102.7 | 37.7 | −93.3 | | | | |
| Zoom15 | 233.1 | 166.7 | 96.7 | 26.0 | −127.6 | | | | |
| Zoom16 | 237.0 | 162.9 | 83.8 | 3.1 | | | | | |
| Zoom17 | 237.9 | 155.8 | 68.2 | −21.1 | | | | | |
| Zoom18 | 240.9 | 148.0 | 48.0 | −55.0 | | | | | |
| Zoom19 | 240.7 | 138.1 | 27.8 | −85.6 | | | | | |
| Zoom20 | 241.2 | 119.5 | −8.3 | −136.7 | | | | | |
| Zoom21 | 234.6 | 92.8 | −51.4 | −191.8 | | | | | |

FIG. 5

|        | Fδ |
|--------|----|
| Zoom0  | 24 |
| Zoom1  | 26 |
| Zoom2  | 27 |
| Zoom3  | 28 |
| Zoom4  | 29 |
| Zoom5  | 29 |
| Zoom6  | 29 |
| Zoom7  | 30 |
| Zoom8  | 30 |
| Zoom9  | 30 |
| Zoom10 | 29 |
| Zoom11 | 29 |
| Zoom12 | 30 |
| Zoom13 | 30 |
| Zoom14 | 30 |
| Zoom15 | 30 |
| Zoom16 | 30 |
| Zoom17 | 31 |
| Zoom18 | 31 |
| Zoom19 | 31 |
| Zoom20 | 32 |
| Zoom21 | 32 |

FIG. 6

| OBJECT DISTANCE (mm)→ | FOCUS CORRECTION AMOUNT (μm) WHEN F VALUE IS CHANGED FROM OPEN (F2.8) TO F8 | | | | | | | | |
|---|---|---|---|---|---|---|---|---|---|
| | INFINITY | 1380 | 680 | 453 | 340 | 272 | 226 | 194 | 175 |
| Zoom0 | 5.7 | -17.4 | -42.4 | -68.5 | -95.8 | -124.6 | -154.6 | -186.0 | -210.3 |
| Zoom1 | 12.9 | -9.7 | -34.4 | -59.8 | -86.5 | -114.4 | -143.5 | -174.0 | |
| Zoom2 | 16.6 | -6.7 | -30.8 | -55.7 | -82.2 | -109.6 | -138.1 | | |
| Zoom3 | 20.1 | -3.7 | -27.9 | -52.6 | -79.0 | -105.8 | -133.7 | | |
| Zoom4 | 24.0 | -0.3 | -24.9 | -49.7 | -76.6 | -103.6 | | | |
| Zoom5 | 28.4 | 2.3 | -22.2 | -47.5 | -75.0 | -102.3 | | | |
| Zoom6 | 33.8 | 7.1 | -19.5 | -45.4 | -73.9 | -101.7 | | | |
| Zoom7 | 38.3 | 10.5 | -16.8 | -43.1 | -72.3 | -100.6 | | | |
| Zoom8 | 43.1 | 14.6 | -13.5 | -40.3 | -70.7 | -100.0 | | | |
| Zoom9 | 48.3 | 18.2 | -11.3 | -38.9 | -70.7 | -100.8 | | | |
| Zoom10 | 53.3 | 22.1 | -8.7 | -37.4 | -71.6 | | | | |
| Zoom11 | 56.8 | 24.5 | -7.3 | -36.4 | -72.1 | | | | |
| Zoom12 | 61.9 | 26.6 | -7.4 | -37.2 | -74.2 | | | | |
| Zoom13 | 65.5 | 28.5 | -8.2 | -38.6 | -77.5 | | | | |
| Zoom14 | 67.9 | 28.2 | -10.3 | -41.4 | -82.6 | | | | |
| Zoom15 | 68.6 | 27.0 | -12.6 | -44.2 | -88.2 | | | | |
| Zoom16 | 68.6 | 23.1 | -20.4 | -54.9 | | | | | |
| Zoom17 | 62.1 | 12.6 | -36.9 | -78.3 | | | | | |
| Zoom18 | 54.6 | -0.1 | -58.1 | -111.3 | | | | | |
| Zoom19 | 47.1 | -14.5 | -79.6 | -143.0 | | | | | |
| Zoom20 | 39.6 | -36.1 | -114.0 | -192.5 | | | | | |
| Zoom21 | 25.8 | -65.4 | -155.5 | -247.6 | | | | | |

FIG. 9

CORRECTION AMOUNT (f = 340 mm) WHEN OPEN APERTURE (F2.8) AT TIME OF AF IS CHANGED TO APERTURE AT TIME OF PHOTOGRAPHING

| APERTURE → | OPEN | F4 | F5.6 | F8 | F11 | F16 |
|---|---|---|---|---|---|---|
| Zoom0 | 0.0 | -33.2 | -71.4 | -95.8 | -25.0 | 64.8 |
| Zoom1 | 0.0 | -18.9 | -58.6 | -86.5 | -19.2 | 64.7 |
| Zoom2 | 0.0 | -10.1 | -50.5 | -82.2 | -17.9 | 63.7 |
| Zoom3 | 0.0 | -4.1 | -44.1 | -79.0 | -17.4 | 62.2 |
| Zoom4 | 0.0 | 2.6 | -37.4 | -76.6 | -18.5 | 59.5 |
| Zoom5 | 0.0 | 6.3 | -31.3 | -75.0 | -21.0 | 55.4 |
| Zoom6 | 0.0 | 8.2 | -25.6 | -73.9 | -24.5 | 47.6 |
| Zoom7 | 0.0 | 11.7 | -20.1 | -72.3 | -27.4 | 39.6 |
| Zoom8 | 0.0 | 16.0 | -13.6 | -70.7 | -31.3 | 31.8 |
| Zoom9 | 0.0 | 19.6 | -8.2 | -70.7 | -37.3 | 16.8 |
| Zoom10 | 0.0 | 26.3 | -2.0 | -71.6 | -45.1 | 3.4 |
| Zoom11 | 0.0 | 33.5 | 4.0 | -72.1 | -52.3 | -9.5 |
| Zoom12 | 0.0 | 39.5 | 9.7 | -74.2 | -62.4 | -34.1 |
| Zoom13 | 0.0 | 49.1 | 20.3 | -77.5 | -74.9 | -62.6 |
| Zoom14 | 0.0 | 58.4 | 30.9 | -82.6 | -90.3 | -93.3 |
| Zoom15 | 0.0 | 66.6 | 40.4 | -88.2 | -106.1 | -127.6 |
| Zoom16 | | | | | | |
| Zoom17 | | | | | | |
| Zoom18 | | | | | | |
| Zoom19 | | | | | | |
| Zoom20 | | | | | | |
| Zoom21 | | | | | | |

FIG. 20

RESPONSE CHARACTERISTICS TABLE OF FOCUS LENS

| ELAPSED TIME (msec.) | FOCUS POSITION (%) |
|---:|---:|
| 0 | 0 |
| 1 | 20 |
| 2 | 100 |
| 3 | 180 |
| 4 | 50 |
| 5 | 100 |
| ... | ... |
| 30 | 100 |

FIG. 22

RESPONSE CHARACTERISTICS TABLE OF FOCUS LENS

| ELAPSED TIME (msec.) | FOCUS POSITION (%) |
|---:|---:|
| 0 | 0 |
| 1 | 20 |
| ② | 100 |
| 3 | 180 |
| 4 | 50 |
| ⑤ | 100 |
| ... | ... |
| 30 | 100 |

IMAGING APPARATUS HAVING AUTOFOCUS FUNCTION, AND FOCUS ADJUSTMENT METHOD THEREFOR

BACKGROUND OF THE INVENTION

Field of the Invention

The present invention relates to an imaging apparatus and a focus adjustment method therefor, and more particularly to an imaging apparatus having an autofocus function and a focus adjustment method therefor.

Description of the Related Art

Conventionally, as an autofocus method used for an imaging apparatus having an autofocus (hereinafter denoted as AF) function, such as an electronic still camera and a video camera, there have been known a contrast AF method and a phase difference AF method.

The contrast AF method is often used for video cameras and digital still cameras, and an imaging device is used as a focus detection sensor. More specifically, the contrast AF method is a method in which a position of a focus lens, where the contrast (AF evaluation value) in high-frequency components of a luminance signal delivered from the imaging device becomes maximum, is set as an in-focus position. However, as can be understood from the fact that this method is also referred to as the mountain-climbing method, it is necessary to obtain AF evaluation values while stepwise shifting the position of the focus lens in the direction of the optical axis thereof each by a very small amount, and move the focus lens until it is eventually found that one of the AF evaluation values thus obtained is the maximum value. Therefore, it is considered that the contrast AF method is not suited for a high-speed focus detection operation.

On the other hand, the phase difference AF method is often used for single-lens reflex cameras. For example, in a digital single-lens reflex camera, phase difference detection is performed by a focus detection mechanism formed by a secondary imaging optical system. The focus detection mechanism includes a pupil-dividing unit which divides an imaging light flux passing through an exit pupil of an imaging optical system into two areas, and the resultant two imaging light fluxes are caused to form images, via an optical path-dividing unit arranged within a mirror box, on a pair of focus detection sensors, respectively, by the secondary imaging optical system. Then, a deviation amount between signals output according to electric charges accumulated in the pair of focus detection sensors, respectively, i.e. a relative positional deviation amount in the pupil-dividing direction is detected to thereby simultaneously determine an amount and a direction of focus deviation of the imaging optical system (focus lens). That is, it is possible to simultaneously determine an amount and a direction of focus deviation by performing one charge accumulation operation for each focus detection sensor, without moving the focus lens by the mountain-climbing method as in the case of the contrast AF method, and hence it is possible to perform a high-speed focus adjustment operation. When performing photographing after focus detection, the optical path-dividing unit is retracted outside the imaging light flux, and an image is captured by performing exposure to the imaging device. In recent years, there has been known a phase difference AF method using the imaging device (imaging-surface phase-difference AF method). In the imaging-surface phase-difference AF method, imaging pixels in the imaging device are each pupil-divided by micro lenses into focus detection pixels. Then, light flux is received by the plurality of focus detection pixels, whereby image capturing and focus detection are simultaneously performed.

Japanese Laid-Open Patent Publication (Kokai) No. 2001-083407 discloses a technique in which a photodiode included in one pixel, to which light is collected using one micro lens, is divided, whereby respective divided portions of the photodiode receive lights from different pupil surfaces of an imaging lens. With this, it is possible to perform imaging-surface phase-difference detection by comparing outputs from each pair of divided photodiodes.

On the other hand, Japanese Laid-Open Patent Publication (Kokai) No. 2008-96796 describes a problem that if an aperture value is changed during photographing and exposure after performing a focusing operation using one of the above-described AF methods, an image is captured which is out of focus and blurred. To solve this problem, Japanese Laid-Open Patent Publication (Kokai) No. 2008-96796 discloses a camera that performs, in a case where an aperture value at the time of focusing and an aperture value at the time of photographing and exposure do not match, correction of the in-focus position of the focus lens according to a difference between the aperture values.

However, according to the method disclosed in Japanese Laid-Open Patent Publication (Kokai) No. 2008-96796, it is required to move the diaphragm to the changed aperture value and then move the focus lens to the corrected in-focus position, after the user pressing a shutter switch before executing photographing. Thus, it is required to move not only the diaphragm, but also the focus lens which requires more time to be moved because of a larger weight than that of the diaphragm, and hence a problem is caused that a large time lag occurs. This problem is more serious in a case using the imaging-surface phase-difference AF method. This is because in the imaging-surface phase-difference AF method, the aperture value is generally set to an open aperture value during AF control so as to increase focusing accuracy, and hence the user is almost always required to move the diaphragm after pressing the shutter switch before executing photographing.

SUMMARY OF THE INVENTION

The present invention provides an imaging apparatus that is capable of reducing frequency of occurrence of a large time lag before executing photographing after pressing a shutter switch, and a focus adjustment method therefor.

In a first aspect of the present invention, there is provided a imaging apparatus comprising an imaging device that photoelectrically converts an optical image obtained through a focus lens, a focus detection unit configured to perform focus detection based on image signals output from the imaging device in a state in which an aperture value is set to a first aperture value, a driving unit configured to drive the focus lens to a focus position set according to the focus detection performed by the focus detection unit, a first acquisition unit configured to acquire a first correction amount of the set focus position according to a difference between the first aperture value and a second aperture value to be used at a time of photographing, a position determining unit configured to determine a focus position at the time of photographing, and a photographing unit configured to execute photographing at the determined focus position at the time of photographing when a user's operation is received, wherein in a case where the first correction amount is larger than a predetermined amount, the position determining unit determines a focus position corrected according to the first correction amount as the focus position at the time of photographing, whereas in a case where the first correction amount is equal to or smaller than the predetermined amount, the position determining unit determines the set focus position as the focus position at the time of photographing.

In a second aspect of the present invention, there is provided an imaging apparatus comprising an imaging device that photoelectrically converts an optical image obtained through a focus lens, a focus detection unit configured to perform focus detection based on image signals output from the imaging device in a state in which an aperture value is set to a first aperture value, a driving unit configured to drive the focus lens to a focus position which is set according to the focus detection performed by the focus detection unit, a storage unit configured to store a table of time response characteristics in movement of the focus lens, a setting unit configured to set a shutter speed to be used at a time of photographing when a user's operation is received, and a control unit configured to control photographing timing based on the table of time response characteristics and the set shutter speed.

In a third aspect of the present invention, there is provided a focus adjustment method for an imaging apparatus including an imaging device that photoelectrically converts an optical image obtained through a focus lens, comprising performing focus detection based on image signals output from the imaging device in a state in which an aperture value is set to a first aperture value, driving the focus lens to a focus position set according to the focus detection, acquiring a correction amount of the set focus position according to a difference between the first aperture value and a second aperture value to be used at a time of photographing, determining a focus position at the time of photographing, and executing photographing at the determined focus position at the time of photographing when a user's operation is received, wherein said determining includes determining a focus position corrected according to the correction amount as the focus position at the time of photographing, in a case where the correction amount is larger than a predetermined amount, and determining the set focus position as the focus position at the time of photographing, in a case where the correction amount is equal to or smaller than the predetermined amount.

In a fourth aspect of the present invention, there is provided a focus adjustment method for an imaging apparatus including an imaging device that photoelectrically converts an optical image obtained through a focus lens, comprising performing focus detection based on image signals output from the imaging device in a state in which an aperture value is set to a first aperture value, driving the focus lens to a focus position which is set according to the focus detection, storing a table of time response characteristics in movement of the focus lens, setting a shutter speed to be used at a time of photographing when a user's operation is received, and controlling photographing timing based on the table of time response characteristics table and the set shutter speed.

According to the present invention, it is possible to reduce frequency of occurrence of a large time lag before executing photographing after pressing a shutter switch.

Further features of the present invention will become apparent from the following description of exemplary embodiments (with reference to the attached drawings).

BRIEF DESCRIPTION OF THE DRAWINGS

FIG. 3A is a diagram showing an example of a correction value table in the first embodiment.

FIG. 3B is a continuation of FIG. 3A.

FIG. 3C is a continuation of FIG. 3B.

FIG. 5 is a diagram showing an example of a table of depth of field at each zoom position in the first embodiment.

FIG. 6 is a diagram showing an example of a table generated by modifying the table shown in FIG. 3B using the table shown in FIG. 5.

FIG. 9 is a diagram showing an example of a correction value table in a second embodiment.

FIG. 20 is a diagram showing an example of a time response characteristics table in the sixth embodiment.

FIG. 22 is a diagram showing the time response characteristics table shown in FIG. 20, in which highlighting is added to the elapsed times at which the focus position reaches a target position.

DESCRIPTION OF THE EMBODIMENTS

The present invention will now be described in detail below with reference to the accompanying drawings showing embodiments thereof. This invention is not limited to the embodiments described hereafter.

First, a description will be given of the configuration of an imaging apparatus according to a first embodiment with reference to FIG. 1.

Figure 1:
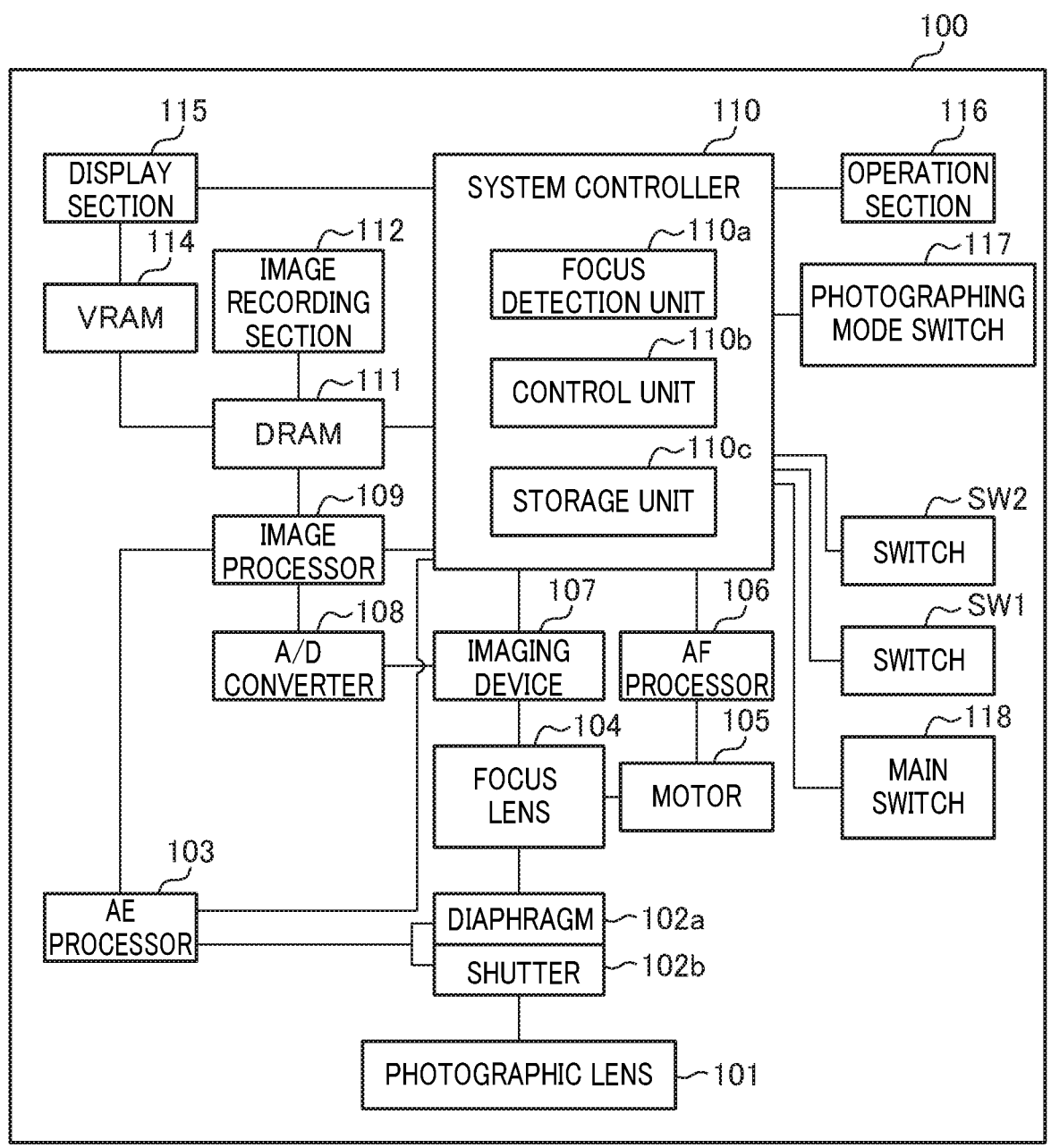
FIG. 1 is a block diagram showing the configuration of an imaging apparatus according to a first embodiment.

FIG. 1 is a block diagram showing the configuration of the imaging apparatus, denoted by reference numeral 100, according to the first embodiment. Note that the imaging apparatus 100 is described by taking a digital camera as an example.

Referring to FIG. 1, the imaging apparatus 100 includes a photographic lens 101 including a zoom mechanism, a diaphragm 102a and a shutter 102b for controlling an amount of light, an AE processor 103, and a focus lens 104.

The photographic lens 101 and the focus lens 104 form an image-capturing optical system. The focus lens 104 can be moved on an optical axis so as to cause an object image (optical image) obtained through the image-capturing optical system to be formed on an imaging device 107, described hereinafter. In the imaging apparatus 100 of the present embodiment, the image-capturing optical system and a body of the imaging apparatus 100 are integrally formed with each other, but this is not limitative. The present embodiment can also be applied to an image-capturing system formed by the body of the imaging apparatus 100 including the imaging device 107 and a lens device (image-capturing optical system) which can be attached to and removed from the body of the imaging apparatus 100.

The imaging apparatus 100 is configured to be capable of performing hybrid AF as a combination of focus adjustment by a phase difference method based on a phase difference between a pair of object images acquired on an imaging surface (imaging-surface phase-difference AF) and focus adjustment by a contrast method (contrast AF). The imaging-surface phase-difference AF and the contrast AF are both performed based on information on the imaging surface, and hence the combination thereof can achieve more improved focus detection accuracy than a combination of non-imaging-surface phase-difference AF and the contrast AF. However, the phase difference AF of the hybrid AF of the present embodiment is not limited to the imaging-surface phase-difference AF. In the following description, the imaging-surface phase-difference AF is sometimes simply referred to as the phase difference AF.

The imaging apparatus 100 further includes a motor 105 that drives the focus lens 104, an AF processor 106, the imaging device 107, an analog-to-digital convertor 108, an image processor 109, a DRAM (random access memory) 111, and an image recording section 112.

The AF processor 106 performs an AF operation (AF processing) for controlling driving of the focus lens 104 using an AF evaluation value. The imaging device 107 photoelectrically converts light reflected from an object (optical image (object image) obtained through the focus lens 104) to electrical signals (analog signals). The analog-to-digital convertor 108 converts the analog signals to digital signals. Further, the analog-to-digital convertor 108 includes a CDS circuit for eliminating output noise from the imaging device 107, and a non-linear amplifier circuit for performing amplification before analog-to-digital conversion. The image processor 109 processes image signals output from the imaging device 107. The DRAM 111 is a built-in memory which is capable of performing high-speed processing, and is used as a high-speed buffer for temporarily storing image data, or a work memory when an image is compressed or expanded. The image recording section 112 is comprised of a recording medium, such as a memory card, and an interface with the recording medium.

Further, the imaging apparatus 100 includes a system controller (a control section, a CPU) 110, a VRAM (image display memory) 114, a display section 115, an operation section 116, a photographing mode switch 117, a main switch 118, a switch SW1, and a switch SW2.

The system controller 110 controls the system operation (operations of the imaging apparatus 100), such as a photographing sequence. The system controller 110 includes a focus detection unit 110a that calculates an AF evaluation value based on image signals output form the imaging device 107 (image processor 109) in a state in which the aperture is set to a first aperture value to thereby perform focus detection. The system controller 110 further includes a control unit 110b that controls the position of the focus lens 104 (hereinafter referred to as the "focus position") based on a focus detection signal output from the focus detection unit 110a, in cooperation with the AF processor 106. Further, the system controller 110 includes a storage unit 110c (internal memory) that stores correction value tables described hereinafter in detail with reference to FIGS. 3A to 3C.

The display section 115 displays not only images, but also an indication for assisting a user for operating the imaging apparatus 100 and an indication of a state of the imaging apparatus 100, and displays when performing photographing, a photographing screen and a distance measurement area. The operation section 116 is used for operating the imaging apparatus 100, and is comprised of a menu switch for making various settings of the imaging apparatus 100, such as settings of a photographing function and settings for reproducing images. Further, the operation section 116 includes a zoom lever for instructing a zoom operation of the photographic lens 101, a switch for switching the operation mode between a photographing mode and a reproduction mode, and so forth. The photographing mode switch 117 is a switch for selecting a photographing mode, such as a macro mode, a long-distance view mode, and a sports mode, and changes a range of distance measurement, the AF operation, and so forth, according to the photographing mode selected by the user. The main switch 118 is a switch for powering on the imaging apparatus 100. The switch SW1 is a switch for performing a photographing preparation operation, including AF (automatic focus detection) and AE (automatic exposure) operations. The switch SW2 is a switch (shutter switch) for executing photographing after operating the switch SW1.

Next, a photographing process performed by the imaging apparatus 100 according to the first embodiment will be described with reference to FIG. 2.

Figure 2:
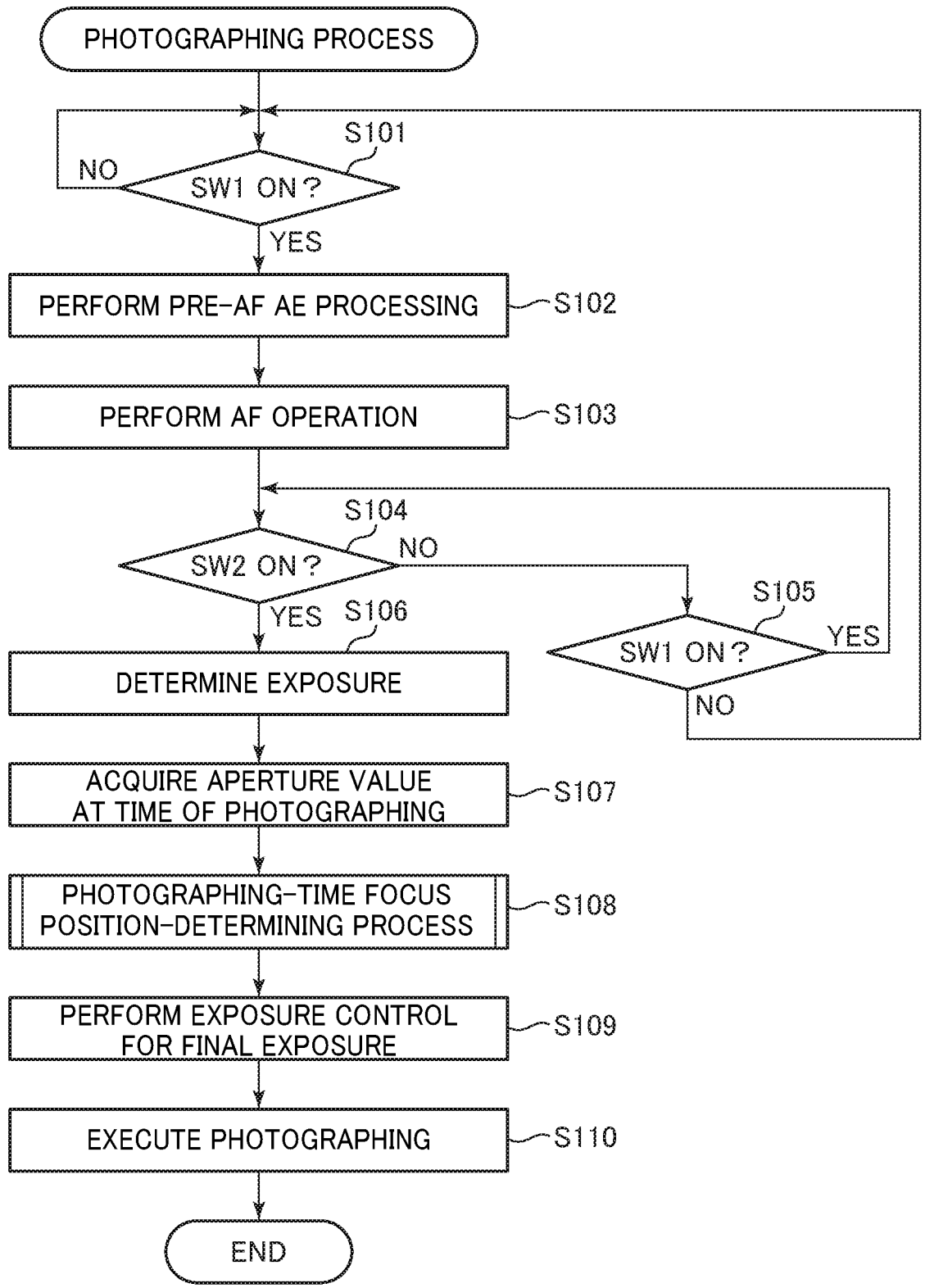
FIG. 2 is a flowchart of a photographing process performed in the first embodiment of the imaging apparatus.

FIG. 2 is a flowchart of the photographing process performed by the imaging apparatus 100. Each step in FIG. 2 is executed based on a command from the system controller 110.

First, in a step S101, the system controller 110 determines a state of the switch SW1. If the switch SW1 is in a pressed state, i.e. in an on-state (YES to the step S101), the system controller 110 proceeds to a step S102. On the other hand, if the switch SW1 is not in the pressed state, i.e. if the switch SW1 is in an off-state (NO to the step S101), the system controller 110 returns to the step S101.

In the step S102, the system controller 110 performs AE processing (automatic exposure processing) based on an output (image signals) from the image processor 109 (imaging device 107) using the AE processor 103. The AE processing performed in the step S102 is pre-AF AE processing executed in preparation for a subsequent AF operation (automatic focus detection operation). Further, in the step S102, to perform focus correction (correction of a focus position) according to an aperture value, described hereinafter, the system controller 110 stores the aperture value acquired this time (aperture value at pre-AF AE processing: the first aperture value) in the DRAM 111.

Next, in a step S103, the system controller 110 performs the AF operation (AF processing) using the AF processor 106. Exposure conditions (a shutter speed, an aperture value, and a sensitivity of the imaging device 107 (hereinafter simply referred to as the sensitivity)) during the AF operation are determined by the AE processing performed in the immediately preceding step S102. Further, when an in-focus position can be detected by this AF operation, an object distance approximate value is calculated based on the zoom position and the focus position, and the calculated value is set as a photographing condition (object distance), and is stored in the DRAM 111. Then, in a step S104, the system controller 110 determines a state of the switch SW2. If the switch SW2 is in a pressed state, i.e. in an on-state (YES to the step S104), the system controller 110 proceeds to a step S106. On the other hand, if the switch SW2 is not in the pressed state, i.e. if the switch SW2 is in an off-state (NO to the step S104), the system controller 110 proceeds to a step S105.

In the step S105, the system controller 110 determines a state of the switch SW1. That is, if the switch SW1 is in the pressed state, i.e. in the on-state (YES to the step S105), the system controller 110 returns to the step S104. On the other hand, if the switch SW1 is not in the pressed state, i.e. if the switch SW1 is in the off-state (NO to the step S105), the system controller 110 returns to the step S101.

In the step S106, the system controller 110 determines exposure (an aperture value and a shutter speed) for photographing, and then in a step S107, the system controller 110 acquires an aperture value at the time of photographing (second aperture value) from the AE processor 103, and stores the acquired aperture value in the DRAM 111. Thus, in the case where the switch SW2 for executing photographing is pressed, the system controller 110 sets the second aperture value. Then, in a step S108, the system controller 110 performs a photographing-time focus position-determining process. More specifically, if necessary, the focus position at the time of photographing is corrected with a correction value set according to a difference between the first aperture value stored in the step S102 and the second aperture value set in the step S106, i.e. a change between the aperture value at the time of the AF operation and the aperture value at the time of photographing. This photographing-time focus position-determining process will be described in detail with reference to FIG. 4. Then, in a step S109, the system controller 110 performs exposure control for final exposure. In a step S110, the system controller 110 executes photographing, followed by terminating the present process.

Next, the correction value for correcting the focus position will be described with reference to FIGS. 3A to 3C.

FIGS. 3A to 3C show an example of the correction value tables in the first embodiment, which are stored in the storage unit 110*c* of the system controller 110 in advance. The system controller 110 refers to the tables shown in FIGS. 3A to 3C, and acquires a correction value corresponding to the photographing condition, in the step S108 in FIG. 2.

As shown in FIGS. 3A to 3C, in the present embodiment, correction values corresponding to zoom positions between a wide angle end (Wide) and a telephoto end (Tele) are held with respect to each of nine object distances (from ∞ to 175 mm). The correction value is a difference distance between in-focus image plane values on the optical axis, measured when the aperture value is changed from an open aperture value (F2.8) to one of aperture values Av of F4, F8, and F16, in units of μm (micrometer). Further, the correction value is held for each of 22 zoom positions. Here, the correction value is a value indicative of a defocus amount, and has information on the correction amount and a correction direction (+, −).

The system controller 110 obtains a focus correction amount (correction value) between the aperture value at the time of the AF operation, stored in the DRAM 111 in the step S102, and the aperture value at the time of photographing, stored in the DRAM 111 in the step S107, using the correction value tables shown in FIGS. 3A to 3C. In doing this, a correction value for a photographing condition corresponding to an intermediate value between the photographing conditions (adjacent photographing conditions) held in the tables shown in FIGS. 3A to 3C is calculated by interpolation using the plurality of tables shown in FIGS. 3A to 3C by way of example. For example, linear interpolation is performed with respect to a direction of the apertures (direction of changing the aperture value Av in FIGS. 3A to 3C), and linear interpolation using a reciprocal of the object distance is performed with respect to a direction of the object distances (lateral direction in FIGS. 3A to 3C). That is, the focus correction amount is set according to a photographing condition. The interpolation method is not a main point of the present invention, and hence description thereof is omitted.

In the present embodiment, each correction value included in the tables shown in FIGS. 3A to 3C is calculated as an initial value (design value) in advance by performing optical simulation, and is different depending on an individual difference between manufactured products of the imaging apparatus 100. Further, parameters which are low in the degree of influence may be further thinned out with respect to each of the object distance, the zoom position, and the aperture value, according to a result of the optical simulation. Inversely, the thinning-out of parameters which are high in the degree of influence may be reduced. Further, in a case where linear interpolation cannot be performed as a result of the optical simulation, a correction value may be calculated by an approximation method.

In a case where an error from the initial value (design value) is large depending on each individual product of the imaging apparatus 100, adjustment is individually performed. This adjustment is performed by creating a cam table associating the focus position and the object distance. Note that contents of this adjustment are not a main point of the present invention, and hence description thereof is omitted. To reduce the adjustment time (costs), by acquiring adjustment values with respect to predetermined object distances, zoom positions, and aperture values, and the correction values included in the tables shown in FIGS. 3A to 3C may be replaced by results of this acquisition. Further, each correction value may be changed according to a color or a luminance of an object. Further, the configuration may be such that by holding both of the adjustment values and the design values, if it is determined that the photographing condition is close to an environment at the time of the adjustment, the adjustment values are employed, whereas if not, the design values are employed.

Next, focus correction in the present embodiment (focus correction based on a change in the aperture value, i.e. aperture-based focus correction) will be described with reference to FIG. 4.

Figure 4:
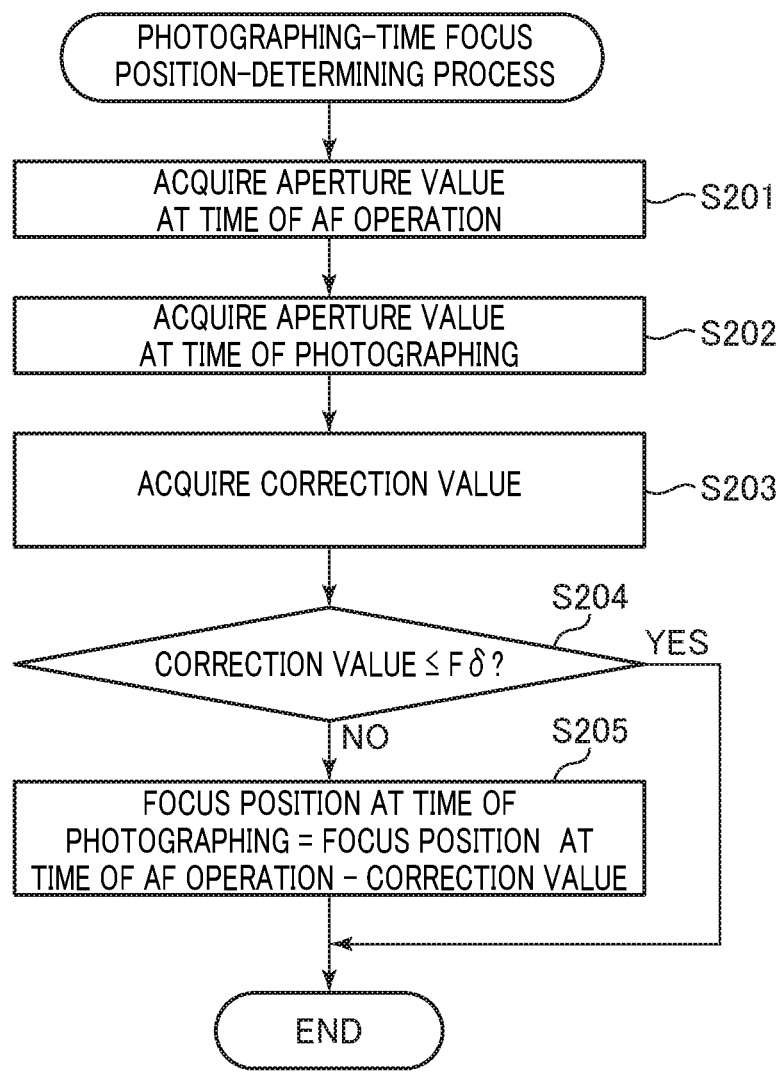
FIG. 4 is a flowchart of a photographing-time focus position-determining process performed in a step in FIG. 2.

FIG. 4 is a flowchart of the photographing-time focus position-determining process performed in the step S108 in FIG. 2. Each step in FIG. 4 is executed based on a command from the system controller 110.

First, in a step S201, the system controller 110 acquires the aperture value at the time of the AF operation (aperture value stored when the pre-AF AE processing is performed in the step S102) from the DRAM 111. Then, in a step S202, the system controller 110 acquires the aperture value at the time of photographing (aperture value stored in the step S107) from the DRAM 111. Then, in a step S203, the system controller 110 acquires a correction value corresponding to the photographing condition (the object distance, the zoom position, the aperture values) described with reference to FIGS. 3A to 3C.

Then, in a step S204, the system controller 110 judges the magnitude of the correction value acquired in the step S203. This step is for determining whether or not correction of the focus position is required. Incidentally, although in general, a lens for a camera has an in-focus position in the strict sense only on one plane perpendicular to the optical axis, there exists a range in which it can be said that an image is sufficiently clearly formed, i.e. so-called depth of field (expressed by Fδ in the present embodiment) even before and after the one plane. The depth of field (Fδ) is determined mainly depending on a lens optical system, but is slightly changed depending on a photographing condition, such as a zoom position.

FIG. 5 is a diagram showing an example of a table of the depth of field for each zoom position in the present embodiment. The value of Fδ is an imaging surface value in units of μm. In actuality, although the value of Fδ varies not only with the zoom position, but also with the aperture value at the time of photographing, in the present embodiment, the description is given assuming that the value of Fδ does not vary with the aperture value, for simplicity of explanation. The table shown in FIG. 5 is also stored in the storage unit 110c (internal memory).

FIG. 6 shows a table generated by modifying the table shown in FIG. 3B using the table shown in FIG. 5, in which boxes each containing the absolute value of a focus correction amount (correction value) equal to or smaller than a depth of field (Fδ) are shown in gray. For example, this table shows that in a case where an aperture value at the time of an AF operation is the open aperture value (F2.8), and an aperture value at the time of photographing is Fδ, the absolute value of a focus correction amount is smaller than a depth of field, when the zoom position is at Zoom0 (Wide end), and the object distance is in a range from infinity to 1380 mm. In the step S204 in FIG. 4, the system controller 110 determines whether or not the absolute value of the correction value acquired in the step S203 is equal to or smaller than a depth of field (equal to or smaller than a predetermined amount) using the table shown in FIG. 5. If it is determined that the absolute value is equal to or smaller than the depth of field (YES to the step S204), it is determined that focus detection is not required, so that the present process is terminated to complete the photographing-time focus position-determining process in step S108. On the other hand, if it is determined that the absolute value is larger than the depth of field (NO to the step S204), the system controller 110 proceeds to a step S205. In the step S205, the correction value calculated in the step S203 is subtracted from the in-focus position detected by the AF processing (focus position at the AF operation) in the step S103 to acquire a focus position at the time of photographing (focus position after correction), and the acquired focus position is set as a photographing condition. After that, the system controller 110 terminates the present process to complete the photographing-time focus position-determining process in the step S108.

Figure 7:
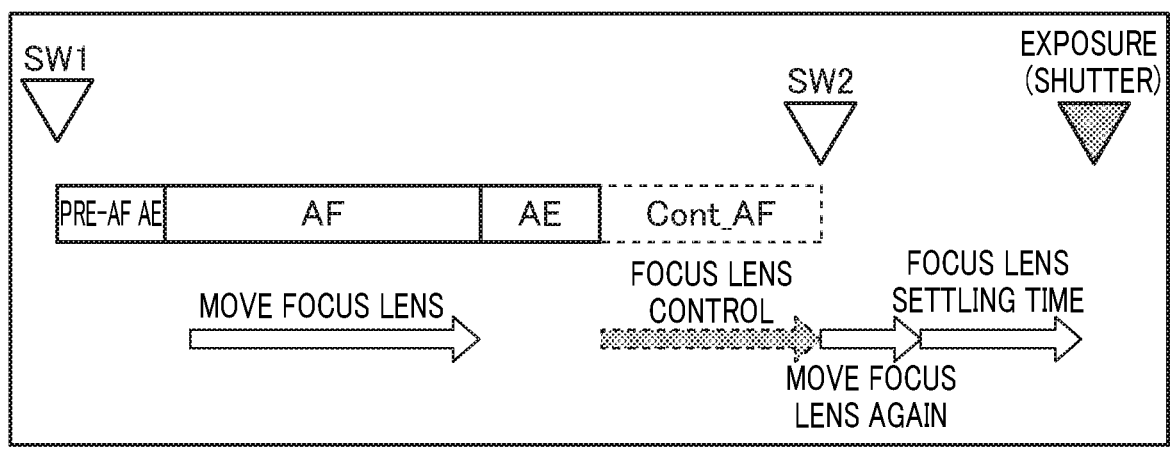
FIG. 7 is a diagram showing a photographing sequence of the imaging apparatus in a conventional case in which all focus correction processing is performed according to a change in the aperture value during shift of the operation from an AF operation to a photographing operation.
Figure 8:
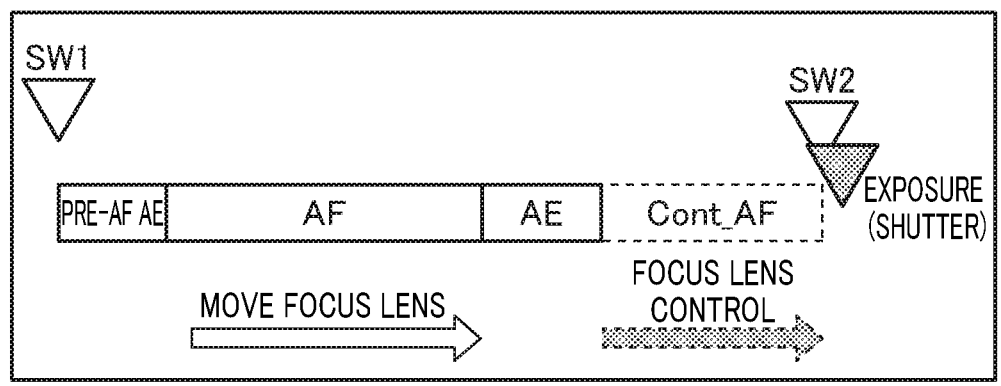
FIG. 8 is a diagram showing a photographing sequence of the imaging apparatus in a case where it is determined in a step in FIG. 4 that focus correction is not needed.

The effect of the present invention, obtained by the present embodiment, will be described with reference to FIGS. 7 and 8. FIG. 7 is a diagram showing a photographing sequence of the imaging apparatus 100 in a conventional case in which all focus correction processing is performed according to a change in the aperture value during shift of the operation from an AF operation to a photographing operation. FIG. 8 is a diagram showing a photographing sequence of the imaging apparatus 100 in a case where it is determined in the step S204 in FIG. 4 that focus correction is not required.

In the conventional case, first, after the AF operation is performed in the step S103 in FIG. 2, so long as the steps S104 and 105 are repeated until the switch SW2 is pressed, the continuous AF (Cont AF) operation is performed at the focus position, whereby the in-focus state is kept, as illustrated in FIG. 7. Immediately after the switch SW2 is pressed in FIG. 7, the focus position is moved according to the focus correction amount based on the aperture value (aperture-based focus correction amount) at the time of photographing. For example, in a case where the photographing conditions are such that the aperture value at the time of an AF operation is the open aperture value (F2.8), the aperture value at the time of photographing is Fδ, the object distance is 680 mm, and the zoom position is Zoom3, a correction value of −27.9 μm is acquired from the table shown in FIG. 3B. When the focus lens 104 is moved by 27.9 μm by the standard motor 105, several msec. is required to move the focus lens 104. Further, a settling time for the focus lens 104 is provided as a time period to elapse after the shutter 102b is released until exposure is executed. Here, the settling time is a time period provided to prevent a photographed image from being blurred due to a shake of the focus lens 104 caused after the focus lens 104 is moved according to the aperture-based focus correction amount, i.e. a time period it takes before the shake of the focus lens 104 is stopped. As the settling time, a time period corresponding to 10 times the length of the movement time of the focus lens 104 is required, and in the present example, time of approximately several tens msec. is required. That is, a delay time (time lag) of approximately several tens msec. is generated after the switch SW2 is pressed until the shutter 102b is released to start exposure.

On the other hand, in the present embodiment, the depth of field is 28 μm under the photographing conditions described above with reference to FIG. 7 by way of example, and hence it is determined in the step S204 that focus correction is not required. As a result, when the switch SW2 is pressed, the shutter 102b is immediately released to start exposure. More specifically, when the switch SW2 is pressed, after the lapse of a time period required for the diaphragm 102a to move from the open aperture value as the aperture value at the time of the AF operation to Fδ as the aperture value at the time of photographing, which is as short as approximately 1 msec., the shutter 102b is released, and exposure is started. This is because the weight of the diaphragm 102a is light, compared with the focus lens 104, and hence it is possible to reduce the settling time after moving the diaphragm 102a. In FIG. 8, the time lag generated after the switch SW2 is pressed until the shutter 102b is released is very short, and hence it is possible to acquire an image at a shutter timing intended by the user.

Although in the present embodiment, correction of the focus position at the time of an AF operation is described, this is not limitative. In a case where the focus position is manually adjusted by a user (MF operation), correction may be similarly performed by comparing the condition at the time of focus adjustment and the condition at the time of photographing. That is, in a case where a difference is generated between an aperture value at the time of an MF operation and a aperture value at the time of photographing, and also an aperture-based focus correction amount (absolute value of a correction value) is equal to or smaller than a depth of field, it is determined that correction of the focus position is not required, and exposure is started immediately after the switch SW2 is pressed.

Thus, in the present embodiment, in a case where the second aperture value (aperture value at the time of photographing) set for photographing is different from the first aperture value (aperture value at the time of an AF operation), the control unit 110b determines, based on the photographing conditions and a difference between the first and second aperture values, whether or not focus correction is required. If the focus correction amount (absolute value of the correction value) is equal to or smaller than such a predetermined amount (depth of field) that will not cause blur of a photographed image, it is determined that focus correction is not required, and photographing is executed according to the photographing sequence shown in FIG. 8 with a very short time lag generated after the switch SW2 is pressed. This enables the user to perform photographing on demand without feeling stress. Here, preferably, the photographing condition in the present invention refers to at least one of the object distance, the zoom position, and the color or luminance of an object.

Next, a description will be given of an imaging apparatus according to a second embodiment of the present invention. The imaging apparatus, denoted by reference numeral 100, according to the second embodiment has the same configuration as that of the first embodiment, and hence description thereof is omitted.

FIG. 9 is a diagram showing an example of a correction value table in the second embodiment. The table shown in FIG. 9 shows the aperture-based focus correction amount (correction value) for each aperture value at the time of photographing in a case where the aperture value at the time of an AF operation is the open aperture value (F2.8), and the object distance is 340 mm. Similar to FIG. 6, zones of the photographing conditions, in which the focus correction amount is equal to or smaller than the depth of field (Fδ), are shown in gray. Here, a case of photographing conditions, where the user of the imaging apparatus 100 selects Zoom4 as the zoom position and the aperture value at the time of photographing is Fδ, will be described. The correction value is determined to be −76.6 μm from the table shown FIG. 9, and on the other hand, the depth of field (Fδ) is determined to be 29 μm from the table shown in FIG. 5, and hence the absolute value of the correction value corresponds to approximately 2.5 times as large as Fδ. In this case, unless aperture-based focus correction is performed when the switch SW2 is pressed, a photographed image is completely blurred. Therefore, in the present embodiment, the photographed image is prevented from being blurred even under such photographing conditions, and also a time lag generated after the switch SW2 is pressed is made small. More specifically, although the photographing process of the present embodiment is basically the same as the photographing process in FIG. 2, in the step S108, a photographing-time focus position-determining process, described hereafter with reference to FIG. 10, is performed.

Figure 10:
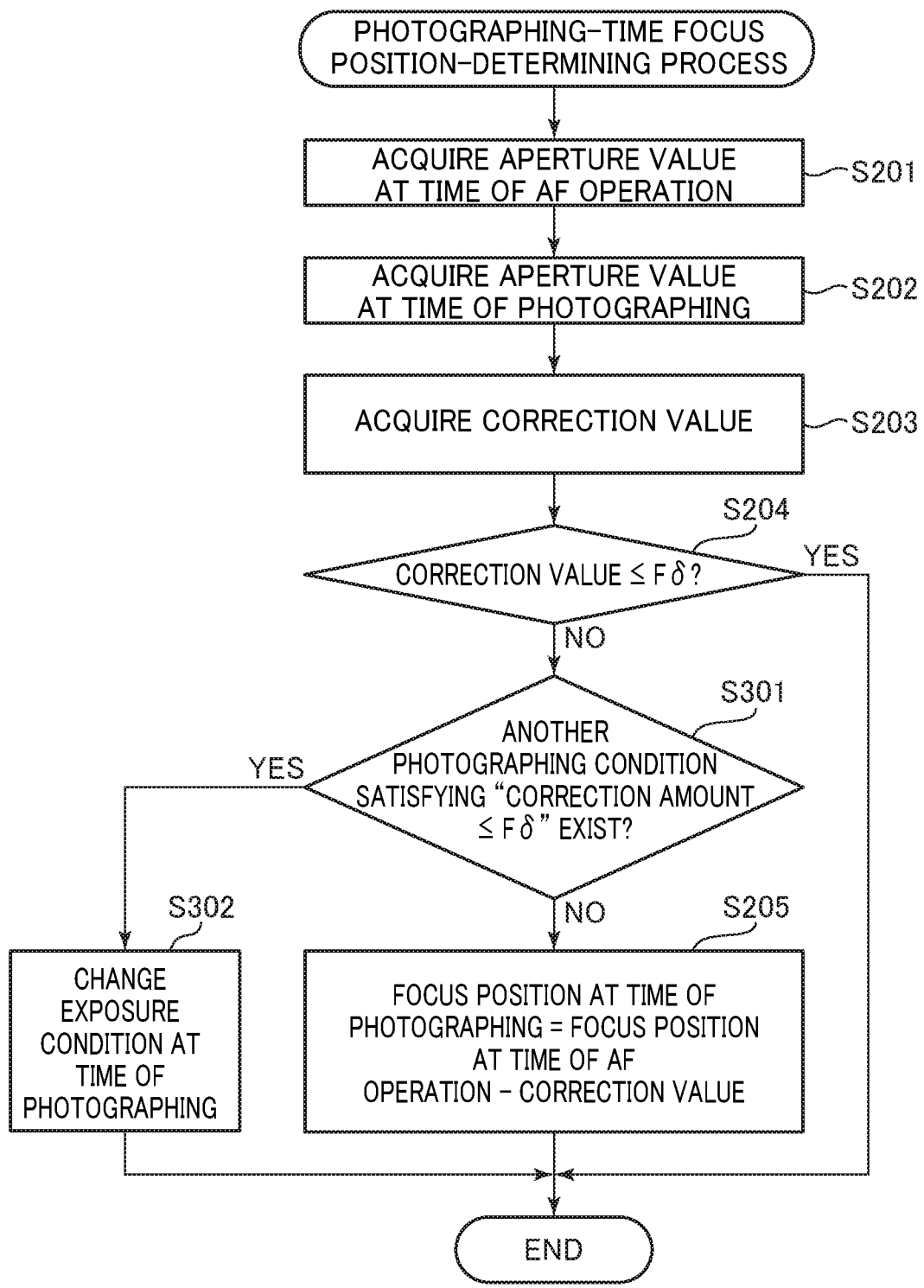
FIG. 10 is a flowchart of a photographing-time focus position-determining process performed in the step in FIG. 2 in the second embodiment.

FIG. 10 is a flowchart of the photographing-time focus position-determining process performed in the step S108 in FIG. 2 in the present embodiment. Each step in FIG. 10 is executed based on a command from the system controller 110.

Note that the same steps as those of FIG. 4 are denoted by the same step numbers, and description thereof is omitted.

Referring to FIG. 10, first, after execution of the steps S201 to S203, if it is determined in the step S204 that the focus correction amount (absolute value of the correction value) is larger than the value of the depth of field, the system controller 110 proceeds to a step S301. In the step S301, the system controller 110 searches the correction value table shown in FIG. 9 for another photographing condition at the same zoom position and the same object distance, which satisfies the condition that the focus correction amount is equal to or smaller than the depth of field. As shown in FIG. 9, this condition is satisfied by further narrowing the aperture value at the time of photographing from Fδ as the aperture value acquired in the step S202, and hence it is determined that another photographing condition exists, and the system controller 110 proceeds to a step S302. In the step S302, the system controller 110 changes the aperture value at the time of photographing to an aperture value corresponding to a focus correction amount equal to or smaller than the depth of field. Further, the system controller 110 changes the exposure condition at the time of photographing, more specifically, the exposure time, or alternatively, an amplification factor of the analog-to-digital convertor 108, so as to prevent the exposure amount at the time of photographing from being changed even after the aperture value is changed. With the photographing conditions changed as above, the aperture-based focus correction amount is such a very small amount (equal to or smaller than the depth of field) that will not cause blur in a photographed image, and hence it is determined that focus correction is not required, and the present process is immediately terminated.

As described above, in the present embodiment, in a case where the aperture-based focus correction amount is larger than the value of the depth of field, the aperture value at the time of photographing is changed, and the photographing conditions are set again so as to make the aperture-based focus amount equal to or smaller than the depth of field, whereby photographing is executed without moving the focus position from the focus position set at the time of the AF operation. Therefore, exposure is immediately started after pressing the switch SW2.

On the other hand, if it is determined as a result of search in the step S301 that another photographing condition satisfying the above condition is not found, the system controller 110 proceeds to the step S205. In the step S205, the correction value calculated in the step S203 is subtracted from the in-focus position detected by the AF processing (focus position at the AF operation) in the step S103 to acquire a focus position at the time of photographing (focus position after correction), and the acquired focus position is set as a photographing condition. After that, the system controller 110 terminates the present process to complete the photographing-time focus position-determining process in the step S108. In this case, when the switch SW2 is pressed, exposure is started after movement of the focus lens 104 is finished.

Note that a correction value for a photographing condition corresponding to an intermediate value between the photographing conditions (adjacent photographing conditions)

held in the table shown in FIG. 9 is calculated by interpolation using a plurality of tables of which an example is shown in FIGS. 3A to 3C. Further, when selecting the aperture value included in the photographing conditions after the change in the step S302, out of the aperture values satisfying the condition indicated in the step S301, there may be selected an aperture value which is associated with the smallest absolute value of the correction value, or an aperture value which is closest to the aperture value before the change.

According to the present embodiment, the range of photographing conditions which do not require aperture-based focus correction is expanded, and hence it is possible to more expand the range of conditions for providing photographing on demand to the user of the imaging apparatus 100.

Next, a description will be given of an imaging apparatus according to a third embodiment of the present invention. The imaging apparatus, denoted by reference numeral 100, according to the third embodiment has the same configuration as that of the first embodiment, and hence description thereof is omitted.

Figure 11:
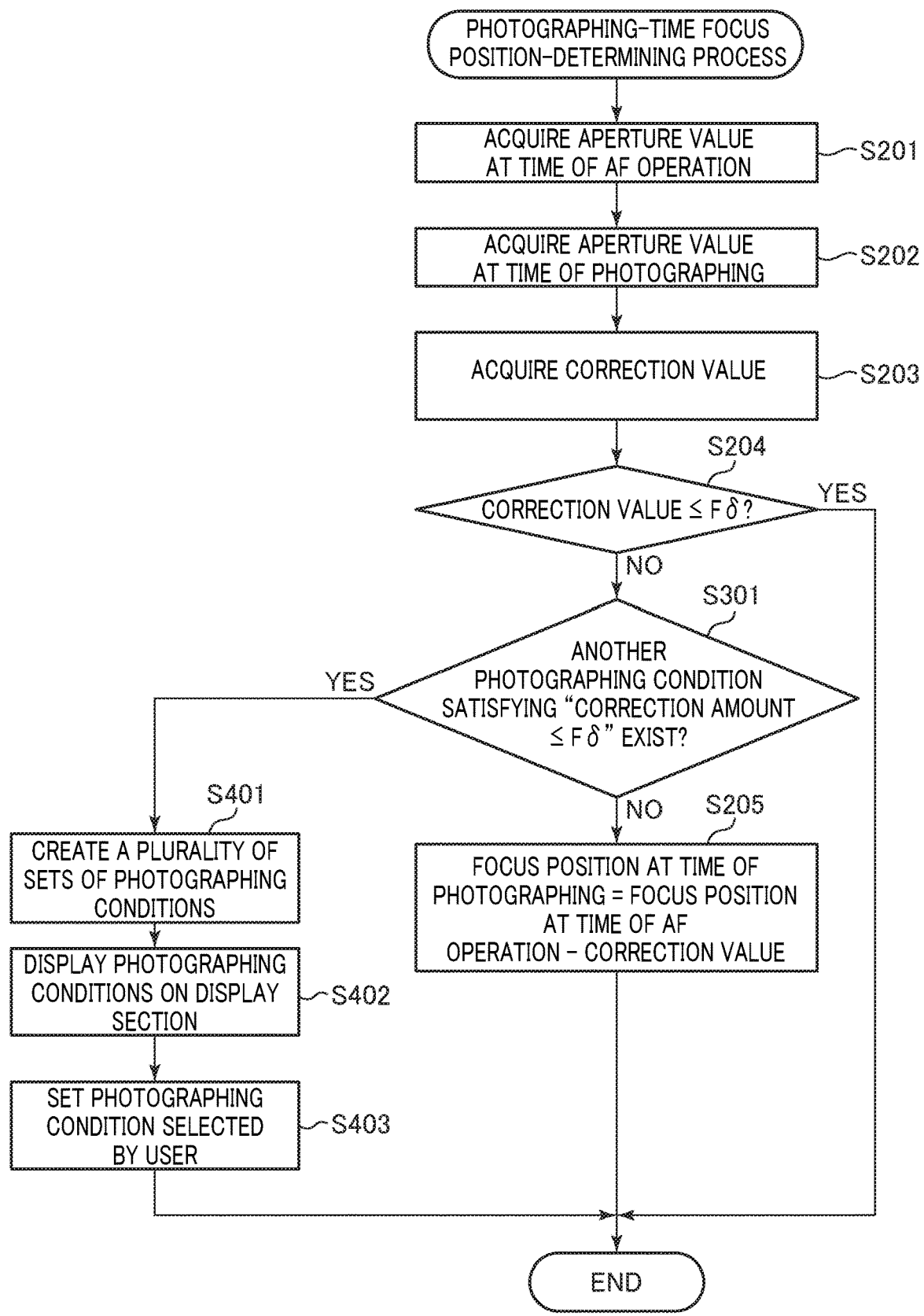
FIG. 11 is a flowchart of a photographing-time focus position-determining process performed in the step in FIG. 2 in a third embodiment.

FIG. 11 is a flowchart of a photographing-time focus position-determining process performed in the step S108 in FIG. 2 in the present embodiment. Each step in FIG. 11 is executed based on a command from the system controller 110.

Note that the same steps as those of FIG. 10 are denoted by the same step numbers, and description thereof is omitted.

Referring to FIG. 11, first, after execution of the steps S201 to S204, in the step S301, the system controller 110 searches the correction value table shown in FIG. 9 for another photographing condition at the same zoom position and the same object distance, which satisfies the condition that the focus correction amount is equal to or smaller than the depth of field. As shown in FIG. 9, this condition is satisfied by further narrowing the aperture value at the time of photographing from Fδ as the aperture value acquired in the step S202, and hence it is determined that another photographing condition exists, and the system controller 110 proceeds to a step S401.

In the step S401, a plurality of sets of photographing conditions satisfying the above condition are created. More specifically, for each detected aperture value satisfying the above condition, a plurality of sets of photographing conditions are created in which the exposure condition at the time of photographing, more specifically, the exposure time or alternatively the amplification factor of the analog-to-digital converter 108, is also changed, so as to prevent the exposure amount at the time of photographing from being changed even when the detected aperture value satisfying the above condition is used.

In a step S402, the system controller 110 displays a list of the plurality of sets of photographing conditions created in the step S401 on the display section 115, and prompts the user to select a set of photographing conditions from the list. Note that the method used in the step S402 is not limitative, but any other method may be used insofar as it can notify a user of the plurality of sets of photographing conditions created in the step S401. For example, respective samples of images each photographed using a different set of photographing conditions may be displayed in a manner selectable by a user.

Figure 12:
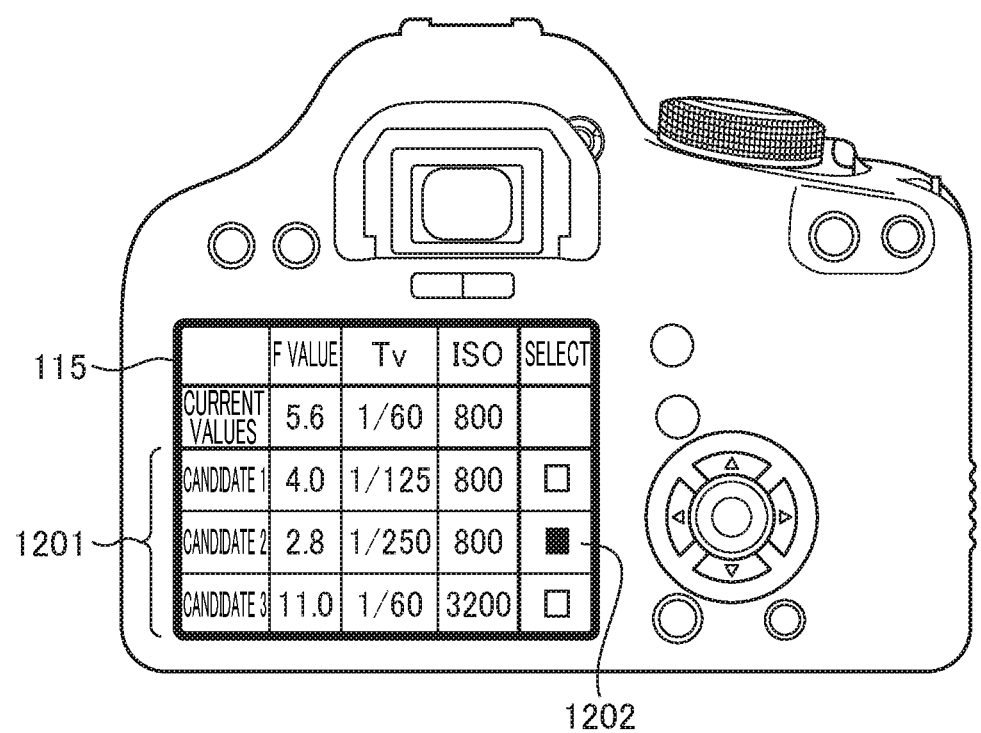
FIG. 12 is a schematic view showing a display section that displays a list of photographing conditions in a step in FIG. 11.

FIG. 12 is a schematic view showing the display section 115 that displays the list of sets of photographing conditions in the step S402 in FIG. 11. In an area 1201, there are displayed sets of photographing conditions as candidates to be changed from the current set of photographing conditions, and in an area 1202, there are displayed buttons for selecting one of the candidates displayed in the area 1201 as a set of photographing condition to which the current set is to be changed by a user's instruction. This enables the user to select a set of photographing conditions suitable for a photographing scene, from the plurality of candidates, using the display section 115.

Referring again to FIG. 11, in a step S403, a set of photographing conditions selected by the user from the list of photographing conditions displayed on the display section 115 in the step S402 is set in the system controller 110, followed by terminating the present process. With this selected set of photographing conditions, the aperture-based focus correction amount is such a small amount (equal to or smaller than the depth of field) that will not cause blur in a photographed image, and hence photographing is executed without moving the focus position from the focus position set at the time of the AF operation. Therefore, after pressing the switch SW2, exposure is immediately started.

On the other hand, if another photographing condition satisfying the above condition is not found as a result of search in the step S301, the system controller 110 proceeds to the step S205. In the step S205, the correction value calculated in the step S203 is subtracted from the in-focus position detected by the AF processing (focus position at the AF operation) in the step S103 to acquire a focus position at the time of photographing (focus position after correction), and the acquired focus position is set as a photographing condition. After that, the present process is terminated to complete the photographing-time focus position-determining process in the step S108. In this case, when the switch SW2 is pressed, exposure is started after movement of the focus lens 104 is finished.

Note that similar to the second embodiment, a correction value for a photographing condition corresponding to an intermediate value between the photographing conditions (adjacent photographing conditions) held in the table shown in FIG. 9 is calculated by interpolation using a plurality of tables an example of which is shown in FIGS. 3A to 3C. Further, when selecting the aperture value included each of the changed set of photographing conditions created in the step S401, out of the aperture values satisfying the condition indicated in the step S301, there may be selected an aperture value which is associated with the smallest absolute value of the correction value, or an aperture value which is closest to the aperture value before the change.

According to the present embodiment, the range of photographing conditions which do not require aperture-based focus correction is expanded, and hence it is possible to more expand the range of conditions for providing photographing on demand to the user of the imaging apparatus 100.

Next, a description will be given of an imaging apparatus according to a fourth embodiment of the present invention. The imaging apparatus, denoted by reference numeral 100, according to the fourth embodiment has the same configuration as that of the first embodiment, and hence description thereof is omitted.

In the fourth embodiment, not only the aperture-based focus correction, but also BP correction is performed.

Figure 13:
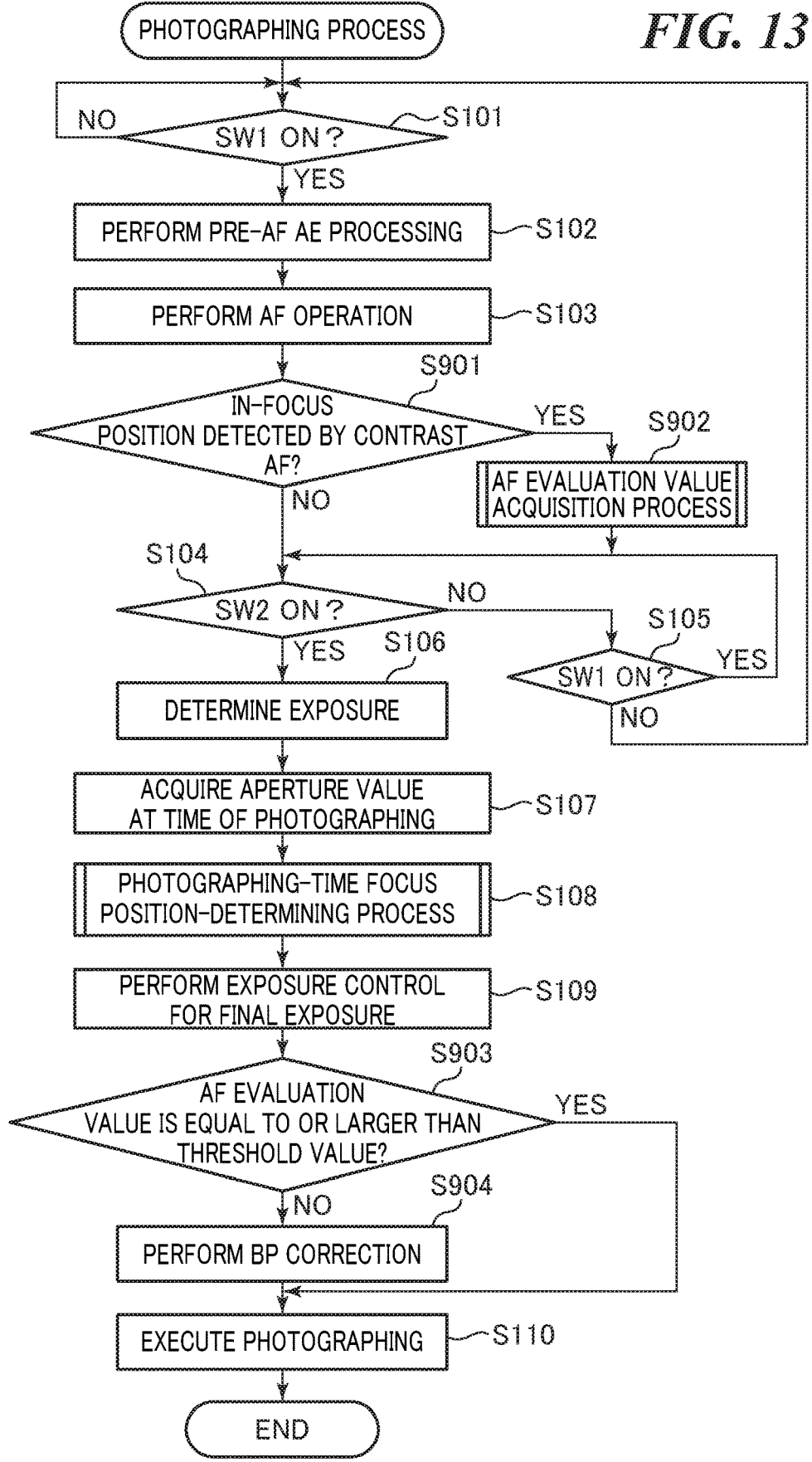
FIG. 13 is a flowchart of a photographing process performed in a fourth embodiment of the imaging apparatus.

FIG. 13 is a flowchart of a photographing process performed by the imaging apparatus 100 according to the present embodiment. Note that the same steps as those of the first embodiment are denoted by the same step numbers, and description thereof is omitted.

Figure 14:
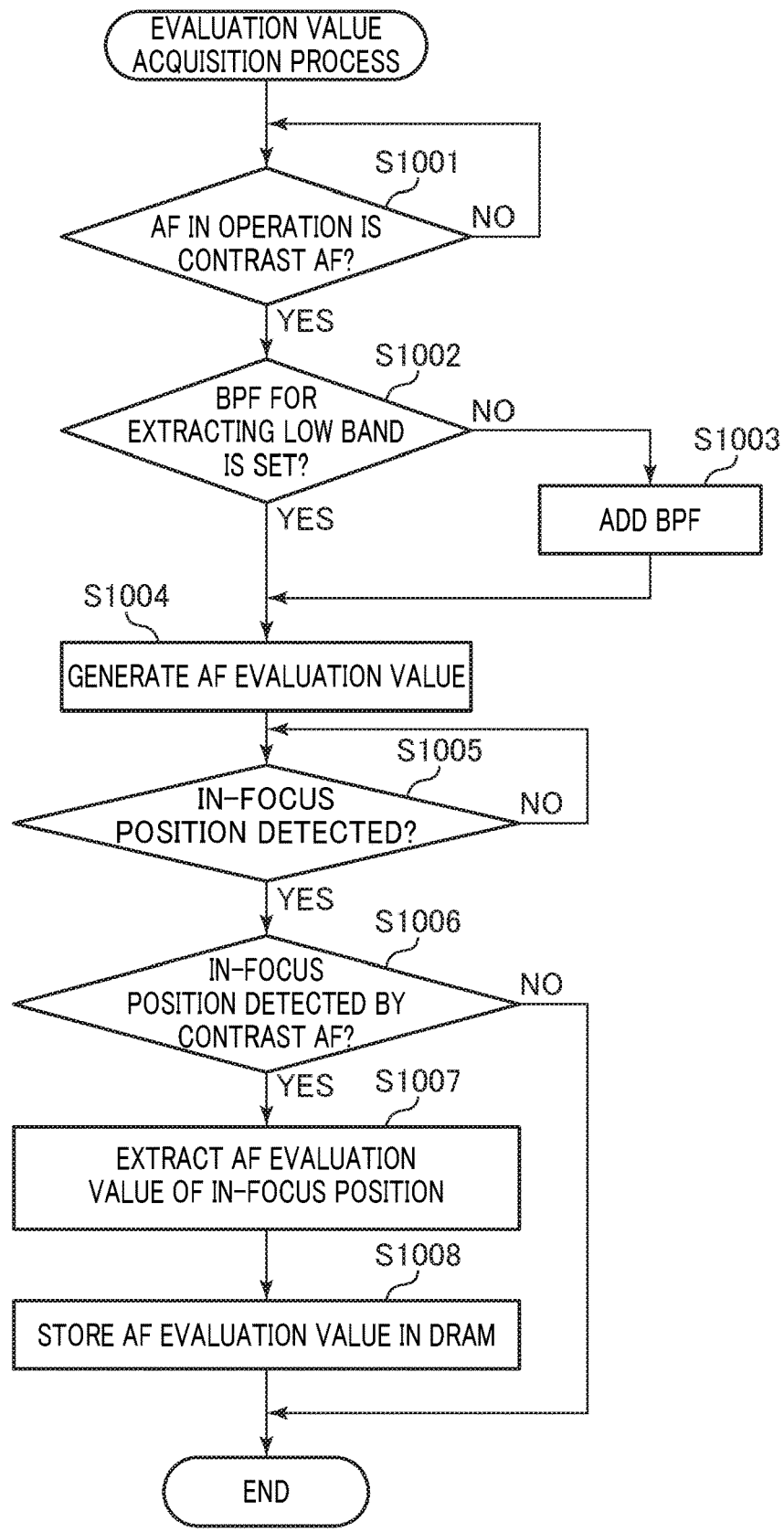
FIG. 14 is a flowchart of an AF evaluation value acquisition process performed in the fourth embodiment.

In the steps S101 to S103, similar to the first embodiment, the system controller 110 determines a state of the switch SW1, and performs the AE processing and the AF operation. Next, in a step S901, the system controller 110 determines whether the in-focus position has been finally detected in the AF operation by the contrast AF method or by another method. If the in-focus position has been detected by the contrast AF method, the system controller 110 proceeds to a step S902, wherein an AF evaluation value acquisition process, described hereinafter with reference to FIG. 14, is performed to store the AF evaluation value of the in-focus position thus acquired in the DRAM 111. Details of the AF evaluation value acquisition process will be described hereinafter with reference to FIG. 14.

Then, the system controller 110 executes the steps S104 to S109, and similar to the first embodiment, when the switch SW2 is pressed, exposure control is performed.

Next, in a step S903, the system controller 110 determines whether or not the AF evaluation value is equal to or larger than a threshold value. Here, if the AF evaluation value is equal to or larger than the threshold value, it is determined that a spatial frequency of the object is in a low frequency band, and the system controller 110 proceeds to the step S110 without performing BP correction. Here, the term "BP correction" refers to correction of an error in the in-focus position, caused according to a difference between the evaluation band of the AF evaluation value and the evaluation band of the photographed image, mainly due to spherical aberration of the imaging optical system. At the time of the contrast AF, to realize higher speed AF, thinning or addition is performed on signals output from the imaging device 107. For this reason, the evaluation band of the AF evaluation value becomes low with respect to a photographed image generated by reading out signals from all pixels. However, the AF evaluation value is generated by applying a low-band filter to the photographed image, and hence when the spatial frequency of the object is low, the AF evaluation value is equal to or larger than the threshold value. Therefore, in a case where the AF evaluation value is equal to or larger than the threshold value, it is possible to judge that the spatial frequency of the object is low, and hence an error in the in-focus position, generated due to the difference between the evaluation band of the AF evaluation value and the evaluation band of the photographed image can be ignored. For this reason, if the AF evaluation value is equal to or larger than the threshold value (YES to the step S903), the system controller 110 proceeds to the step S110 without performing BP correction, and executes photographing. On the other hand, if the AF evaluation value is smaller than the threshold value (NO to the step S903), the system controller 110 proceeds to a step S904, performs BP correction, then proceeds to the step S110 to execute photographing. This threshold value is stored in the storage unit 110c (internal memory) in advance. Note that details of the steps S903 and S904 will be described hereinafter with reference to FIG. 15.

Next, the AF evaluation value acquisition process in the step S902 in the photographing process shown in FIG. 13 will be described with reference to FIG. 14.

First, when the AF operation is started in the step S103 in FIG. 13, if it is determined in a step S1001 that AF in operation is the contrast AF, the system controller 110 proceeds to a step S1002.

In the step S1002, the system controller 110 determines whether or not a bandpass filter (hereinafter referred to as the BPF) which extracts a low band is set. Here, the BPF is one of a plurality of filters different in characteristics, prepared for calculating an AF evaluation value, which is a filter for eliminating noise components in the vicinity of the Nyquist frequency, and preventing alias caused by a high-frequency signal. If a BPF which cannot extract the low band is set (NO to the step S1002), the system controller 110 proceeds to a step S1003 to add a BPF which extracts a low band to thereby make it possible to separately generate an AF evaluation value from the extracted low band, and then proceeds to a step S1004. On the other hand, if a BPF which extracts a low band is set (YES to the step S1002), the system controller 110 directly proceeds to the step S1004.

In the step S1004, an AF evaluation value is generated based on the image signals output from the imaging device 107. Next, it is determined in a step S1005 whether or not an in-focus position has been detected. If it is determined in the step S1005 that an in-focus position has been detected, the system controller 110 proceeds to a step S1006 to determine whether the in-focus position has been detected by the contrast AF method or by another method. If the in-focus position has been detected by the contrast AF (YES to the step S1006), the system controller 110 proceeds to a step S1007 to extract the AF evaluation value of the in-focus position, and stores the extracted AF evaluation value in the DRAM 111 in a step S1008, followed by terminating the present process. Note that in a case where the BPF is added in the step S1003, the AF evaluation value is extracted using the added BPF in the step S1007.

On the other hand, if the in-focus position has been detected using a method other than the contrast AF (NO to the step S1006), the present process is immediately terminated.

Figure 15:
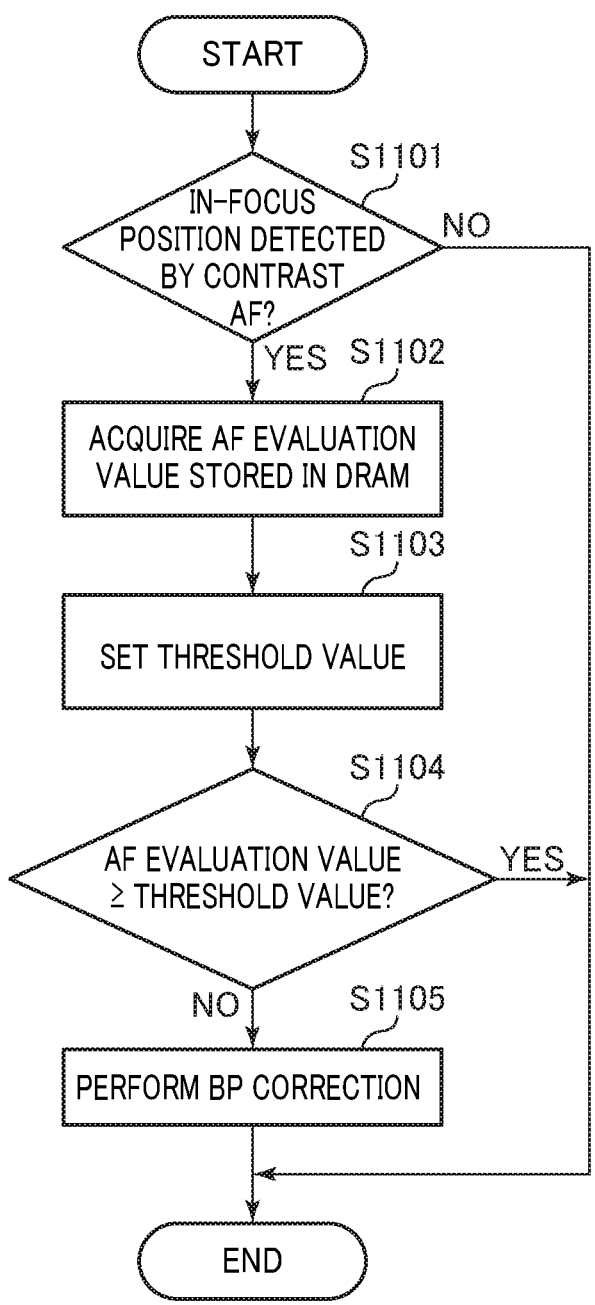
FIG. 15 is a flowchart of a process of details of steps in FIG. 13.

Next, detailed processing performed in the steps S903 and 904 in FIG. 13 will be described with reference to FIG. 15.

When the exposure control is completed in the step S109 in FIG. 13, in a step S1101, the system controller 110 determines whether or not the in-focus position has been detected by the contrast AF. If the in-focus position has been detected by the contrast AF method (YES to the step S1101), determination of whether or not to perform BP correction is needed, and hence the system controller 110 proceeds to a step S1102, and acquires the AF evaluation value stored in the step S1008 in FIG. 14 from the DRAM 111. Next, in a step S1103, the system controller 110 sets a threshold value of the AF evaluation value, with reference to which it is determined whether or not the spatial frequency of an object is low. This threshold value is changed according to a scene determination result, a photographing mode, a photographing condition, and so forth of the imaging apparatus 100. For example, in a case where the photographing mode is the sport mode, photographing having a time lag made as small as possible is required, and hence the threshold value is set to be low. Then, it is determined in a step S1104 whether or not the AF evaluation value acquired in the step S1102 is equal to or larger than the threshold value set in the step S1103. If it is determined in the step S1104 that the AF evaluation value acquired in the step S1102 is equal to or larger than the threshold value set in the step S1103 (YES to the step S1104), the present process is terminated without performing BP correction. On the other hand, if the AF evaluation value is smaller than the threshold value (NO to the step S1104), the system controller 110 proceeds to a step S1105, and performs BP correction, followed by terminating the present process. If it is determined in the step S1101 that the in-focus position has been detected not by the contrast AF method (NO to the step S1101), the present process is immediately terminated.

As described above, in the present embodiment, in a case where an in-focus position is detected by the contrast AF method, a threshold value of the AF evaluation value, with reference to which it is determined whether or not the spatial frequency of an object is low, is set, and whether or not to perform BP correction is determined based on a result of comparison between the threshold value and the AF evaluation value generated by image signals output from the imaging device 107. In a case where the AF evaluation value is equal to or larger than the threshold value, it is determined that the spatial frequency of the object is low, and BP correction is not needed, and hence photographing is executed according to the photographing sequence without a time lag. Thus, it is possible to realize high-speed photographing without a time lag, and hence the user can perform photographing on demand without feeling stress. Here, preferably, the photographing condition refers to at least one of the object distance, the zoom position, and the color or luminance of an object.

Next, a description will be given of an imaging apparatus according to a fifth embodiment of the present invention. The imaging apparatus, denoted by reference numeral 100, according to the fifth embodiment has the same configuration as that of the first embodiment, and hence description thereof is omitted.

Figure 16:
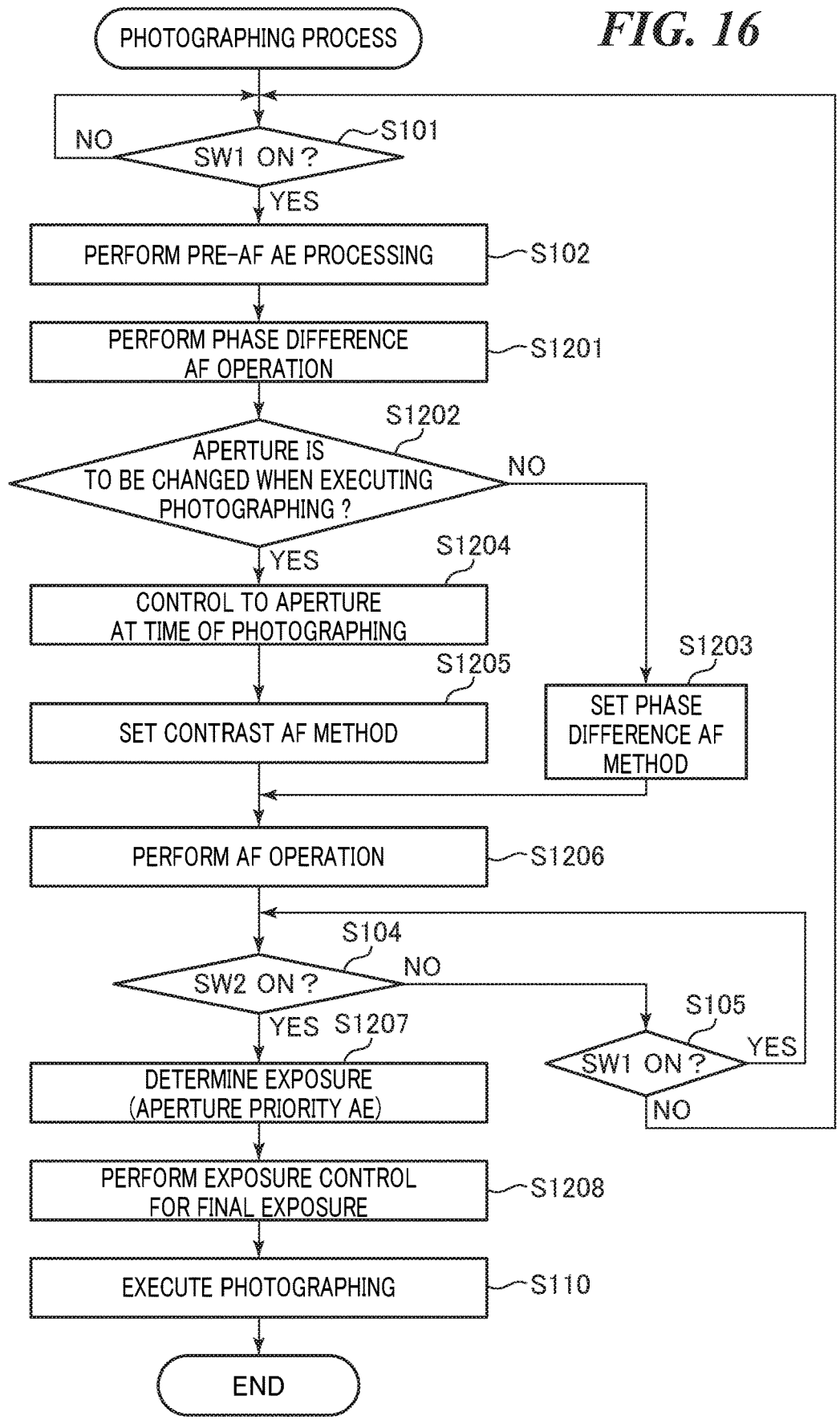
FIG. 16 is a flowchart of a photographing process performed in a fifth embodiment of the imaging apparatus.

FIG. 16 is a flowchart of a photographing process performed by the imaging apparatus 100 according to the fifth embodiment. Each step in FIG. 16 is executed based on a command from the system controller 110.

Note that the same steps as those of FIG. 2 are denoted by the same step numbers, and description thereof is omitted.

First, the steps S101 to 102 are executed. Further, the system controller 110 calculates, based on an output from the imaging device 107 at the time of AE processing in the step S102, an aperture value for photographing (aperture value at the time of photographing, i.e. the second aperture value, in the present embodiment) so as to use the same as an aperture value at the time of an AF operation in a step S1206, referred to hereinafter, and stores the calculated aperture value in the DRAM 111.

Then, the system controller 110 proceeds to a step S1201 to perform focus detection processing by the phase difference AF method, and detects a defocus amount and a direction of moving the focus lens 104. Further, in the step S1201, the aperture value is controlled to the open aperture value.

Then, in a step S1202, the system controller 110 compares the aperture value recorded in the DRAM 111 (aperture value at the time of photographing, i.e. the second aperture value) and the aperture value controlled to in the step S1201 (i.e. the open aperture value). Then, with this comparison, the system controller 110 determines whether or not the aperture value is to be changed from the aperture value (open aperture value) controlled to in the step S1201 when photographing is executed. If it is determined that the aperture value is not to be changed (NO to the step S1202), the system controller 110 proceeds to a step S1203 to set the method of focus detection processing to be performed in the step S1206 to the phase difference AF method. At this time, the aperture value is held at the open aperture value, and is not changed. On the other hand, if it is determined that the aperture value is to be changed (YES to the step S1202), the system controller 110 proceeds to a step S1204 to change the aperture value to the aperture value recorded in the DRAM 111 (aperture value at the time of photographing, i.e. the second aperture value). Further, in a step S1205, the system controller 110 changes the method of focus detection processing to be performed in the step S1206 to the contrast AF method (operation of a switching unit).

Then, in the step S1206, the system controller 110 performs the AF operation (AF processing) again using the AF processor 106. Note that if it is determined in the step S1202 that the aperture value is not to be changed, the step S1206 may be skipped without performing the AF processing again under the same condition as in the step S1201 (phase-difference AF processing in the state in which the aperture value is set to the first aperture value), and the system controller 110 may directly proceed to the step S104.

Then, in the step S104, the system controller 110 determines a state of the switch SW2. If the switch SW2 is in the pressed state, i.e. in the on-state, the system controller 110 proceeds to a step S1207. On the other hand, if the switch SW2 is not in the pressed state, i.e. if the switch SW2 is in the off-state, the system controller 110 proceeds to the step S105. Then, in the step S105, the system controller 110 determines a state of the switch SW1. If the switch SW1 is in the pressed state, i.e. in the on-state (YES to the step S105), the system controller 110 returns to the step S104. On the other hand, if the switch SW1 is not in the pressed state, i.e. if the switch SW1 is in the off-state (NO to the step S105), the system controller 110 returns to the step S101.

In the step S1207, the system controller 110 determines the exposure at the time of photographing by aperture-priority AE in which the aperture value is fixed to the aperture value at the time of the AF operation in the step S1206. Then, in a step S1208, the system controller 110 performs exposure control for final exposure. Then, in the step S110, the system controller 110 executes photographing, followed by terminating the present process.

The effect of the present embodiment will be described with reference to FIGS. 7 and 17. FIG. 7 is the diagram showing the photographing sequence of the imaging apparatus 100 in the conventional case in which all focus correction processing is performed according to a change in the aperture value during shift of the operation from the AF operation to the photographing operation. On the other hand, in the photographing sequence of the imaging apparatus 100 according to the fifth embodiment, shown in FIG. 17, the AF operation is performed using the aperture value at the time of photographing in the step S1206 in FIG. 16. This eliminates a change in the aperture value after the switch SW2 is pressed, and further eliminates movement of the focus position by aperture-based focus correction.

In the conventional case, first, after the AF operation performed in the step S1206 in FIG. 16, the continuous AF operation is performed at the focus position as illustrated in FIG. 7, and the in-focus state is kept while the steps S104 and S105 are repeated until the switch SW2 is pressed. Immediately after the switch SW2 is pressed in FIG. 7, the focus position is moved according to the aperture-based focus correction amount at the time of photographing. As described above in the first embodiment, in the case where the photographing conditions are set such that the aperture value at the time of the AF operation is the open aperture value (F2. 8), the aperture value at the time of photographing is Fδ, the object distance is 680 mm, and the zoom position is Zoom3, a delay time (time lag) of approximately several tens msec. is generated after the switch SW2 is pressed until exposure is started.

Figure 17:
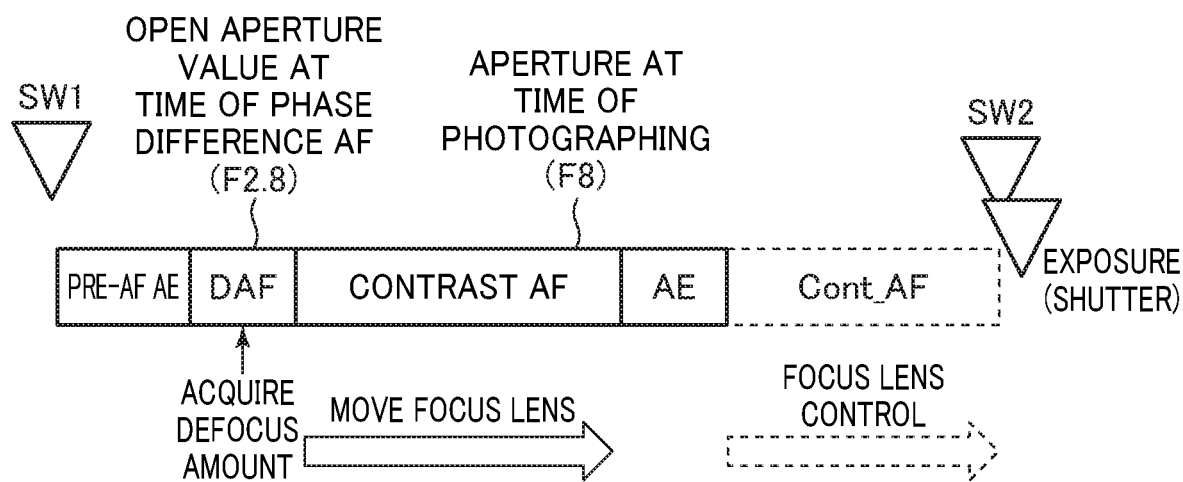
FIG. 17 is a diagram showing a photographing sequence of the imaging apparatus according to the fifth embodiment.

On the other hand, in the photographing sequence in the present embodiment, shown in FIG. 17, first, pre-AF AE processing is performed after the switch SW1 is pressed in the step S101 in FIG. 16, and the aperture value for use at the time of photographing (Fδ) is calculated. After that, in the focus detection processing using the phase difference AF method in the step S1201, the defocus amount and the direction of moving the focus lens 104 are detected. This aperture value is controlled to the open aperture value.

A change from the aperture value (open aperture value) controlled in the step S1201 to the aperture value at the time of photographing (Fδ) is determined in the step S1202, and hence the change to the aperture value at the time of photographing (Fδ) and switching of the AF method to the contrast AF method are performed immediately thereafter (steps S1204 and S1205). Then, the contrast AF operation is performed while moving the focus lens 104 in the moving direction detected in the step S1201 (step S1206).

As described above, in the present embodiment, the aperture value at the time of photographing is set when the focus lens 104 is moved in the contrast AF operation, and hence it is not necessary to consider a focus correction amount to be applied after the switch SW2 is pressed, and exposure is immediately started. That is, in FIG. 17, a time lag generated after the switch SW2 is pressed until the shutter 102b is released is very small, and hence it is possible to acquire an image photographed at a shutter timing intended by a user.

As described above, in the present embodiment, in a case where the aperture value at the time of photographing is different from the aperture value at the time of the phase difference AF, the control unit 110b switches the AF method to the contrast AF method, and performs the AF operation using the aperture value at the time of photographing. With this, it is possible to execute photographing according to the photographing sequence having no time lag without considering focus correction. Since it is possible to realize high-speed photographing without generating a time lag, the user can perform photographing on demand without feeing stress. Here, preferably, the photographing condition refers to at least one of the object distance, the zoom position, and the color or luminance of an object.

Next, a description will be given of an imaging apparatus according to a sixth embodiment of the present invention. The imaging apparatus, denoted by reference numeral 100, according to the sixth embodiment has the same configuration as that of the first embodiment, and hence description thereof is omitted.

Figure 18:
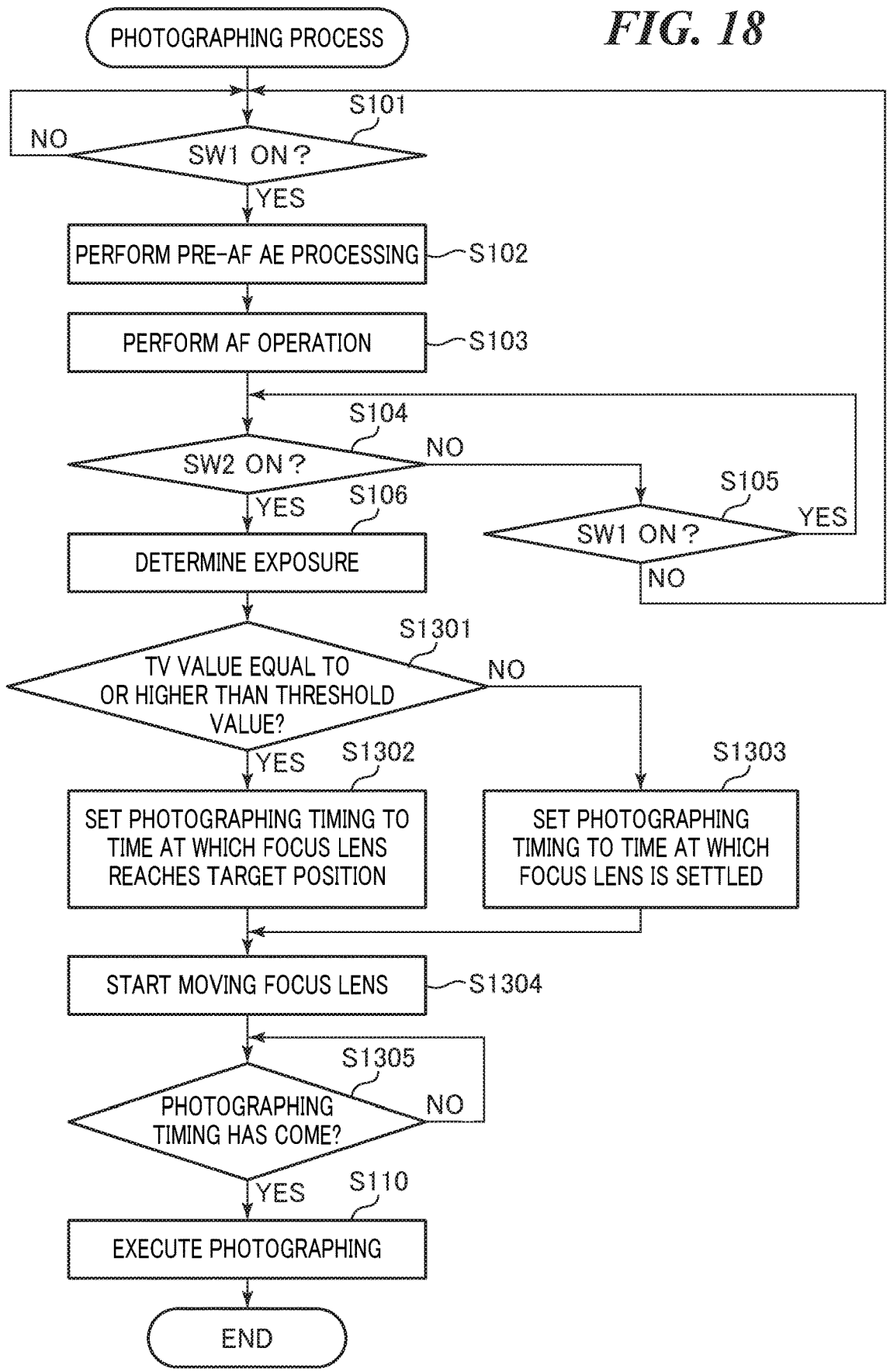
FIG. 18 is a flowchart of a photographing process performed in a sixth embodiment of the imaging apparatus.

FIG. 18 is a flowchart of a photographing process performed by the imaging apparatus 100 according to the sixth embodiment. Each Step in FIG. 18 is executed based on a command from the system controller 110.

Note that the same steps as those of FIG. 2 are denoted by the same step numbers, and description thereof is omitted.

First, after execution of the steps S101 to S106, the system controller 110 proceeds to a step S1301. In the step S1301, the system controller 110 acquires the aperture value at the time of photographing (second aperture value) and the shutter speed (Tv value) from the AE processor 103, and if the acquired shutter speed (Tv value) is equal to or higher than the threshold value, the system controller 110 proceeds to a step S1302. In the step S1302, the system controller 110 sets the photographing timing according to a time response characteristics table, described hereinafter with reference to FIG. 20, which is a table of time response characteristics of the focus lens 104 in the movement thereof and is stored in the storage unit 110c of the system controller 110 in advance. On the other hand, if the acquired shutter speed is lower than the threshold value (NO to the step S1301), the system controller 110 proceeds to a step S1303, and sets the photographing timing to a time point immediately after completion of settlement of the focus lens 104.

Then, in a step S1304, the system controller 110 starts to move the focus lens 104 so as to perform focus correction according to a change between the aperture value at the time of the AF operation and the aperture value at the time of photographing. Then, if it is determined in a step S1305 that the photographing timing set in the step S1202 or S1203 has come, the system controller 110 proceeds to the step S110, and executes photographing, followed by terminating the present process.

Next, the time response characteristics table stored in the storage unit 110c of the system controller 110 in advance will be described with reference to FIGS. 19 and 20.

In a case where the imaging apparatus 100 is a compact and light-weighted camera, when the focus lens 104 is moved by the motor 105, the focus lens 104 is often stopped to a target position while vibrating due to an inertia force.

Figure 19:
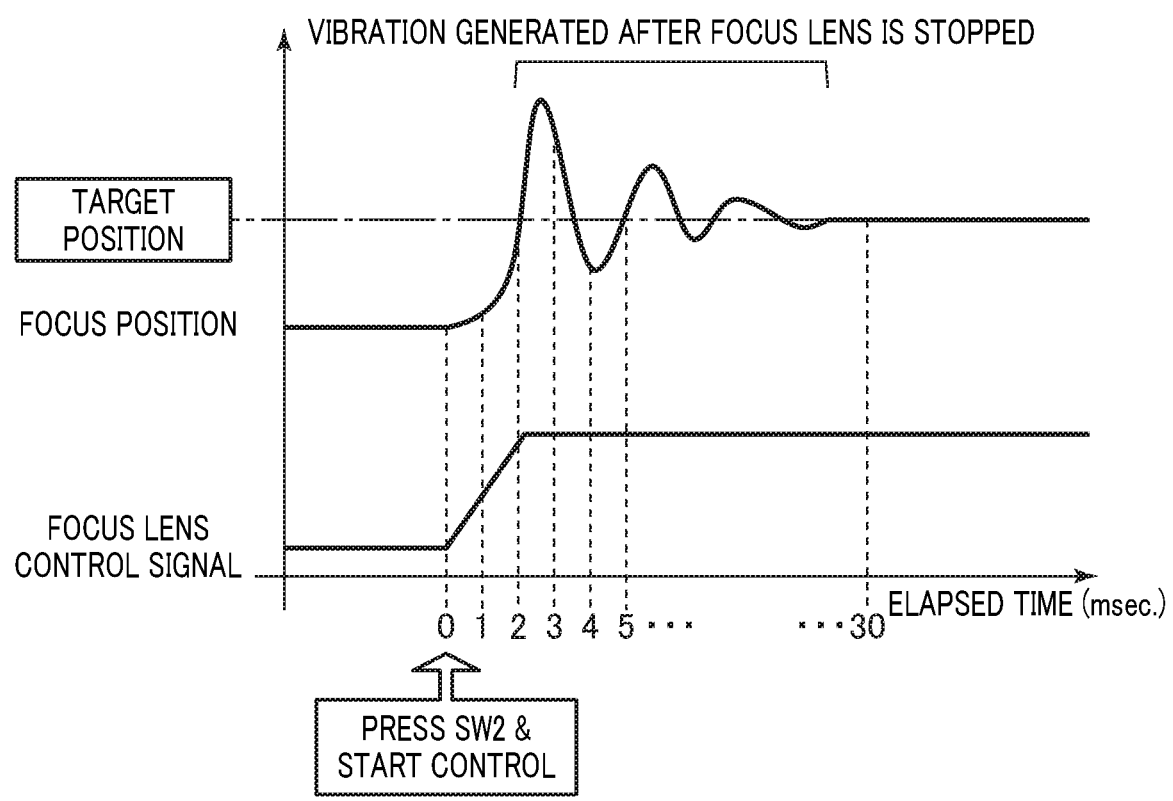
FIG. 19 is a graph showing a change in the position of the focus lens driven by a motor at each elapsed time in the sixth embodiment.

FIG. 19 is a graph showing a change in the position of the focus lens 104 driven by the motor 105 at each elapsed time in the present embodiment. The motor 105 drives the focus lens 104 with a constant driving force as long as the strength of a focus lens control signal transmitted from the system controller 110 to the motor 105 changes at a constant rate. The information indicative of the focus position at each elapsed time, shown in FIG. 19, is measured in advance under a predetermined focus lens movement condition (in the present example, a condition that the focus position is moved to a target position at an elapsed time of 2 msec. after pressing the switch SW2). The measured response characteristics of the focus lens 104, indicated in FIG. 19, are recorded in the storage unit 110c of the system controller 110 in the form of the time response characteristics table. The response characteristics refer to information indicative of the focus position at each elapsed time, which varies after the focus lens 104 starts to be driven until it stops vibrating after ceasing to be driven, to thereby enter the settled state.

FIG. 20 is a diagram showing an example of the time response characteristics table in the present embodiment. The time response characteristics table holds the focus positions at the elapsed times 0 msec. to 30 msec., indicated in FIG. 19, which are indicated in ratios (%) assuming that the focus control start position is set to 0(%), and the target position is set to 100(%).

The values in the time response characteristics table may be recorded as fixed values (design values), or may be recorded as values measured by each individual product of the imaging apparatus 100.

Next, photographing using the time response characteristics table in the present embodiment will be described with reference to FIGS. 18, 21, and 22.

Figure 21:
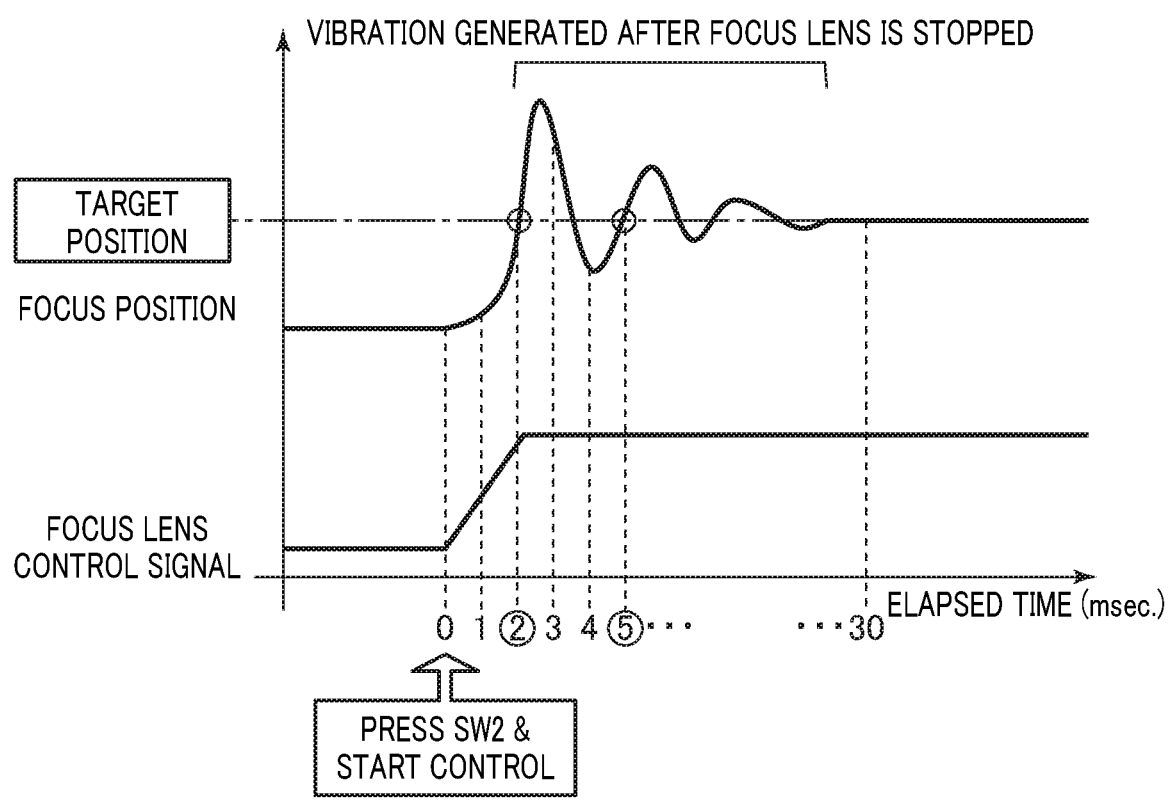
FIG. 21 is a diagram showing the graph shown in FIG. 19, in which highlighting is added to elapsed times at which the focus position reaches a target position.

FIG. 21 shows the graph shown in FIG. 19, in which highlighting is added to elapsed times at which the focus position reaches a target position. Similarly, FIG. 22 shows the time response characteristics table shown in FIG. 20, in which highlighting is added to the elapsed times at which the focus position reaches the target position.

In the flowchart in FIG. 18, after the switch SW2 is pressed in the step S104, the exposure is determined in the step S106. The determination in the step S1301 is performed using the Tv value determined at this time.

If it is determined in the step S1301 that the Tv value determined in the step S106 is lower than the threshold value, the system controller 110 proceeds to the step S1303. This is because if the Tv value is lower than this threshold value, the lens movement amount during the exposure operation becomes so large that it cannot be ignored, and the focus is deviated. For this reason, in the step S1303, the photographing timing is set to a timing after completing settlement of the focus lens 104.

On the other hand, if the Tv value determined in the step S106 is equal to or higher than the threshold value (YES to the step S1301), the system controller 110 proceeds to the step S1202. In the step S1202, the system controller 110 refers to the time response characteristics table shown in FIG. 20, recorded in the storage unit 110c thereof, and determines the photographing timing.

Referring to the time response characteristics table shown in FIG. 22, a position where the focus position is indicated by 100(%) is the target position, which is an in-focus point, and hence the photographing timing is determined in the step S1302 such that photographing is to be executed at the elapsed time of 2 msec.

In doing this, in a case where if photographing is started with the Tv value determined in the step S106 at the elapsed time of 2 msec., the lens movement amount during the exposure operation becomes so large that it cannot be ignored, the photographing timing is set such that photographing is to be executed at an elapsed time of 5 msec. This is because in a case where the exposure time associated with an intermediate shutter speed is set, the lens movement speed at the elapsed time of 2 msec is still too high. If the photographing timing is set such that photographing is to be executed at the elapsed time of 5 msec., the lens movement speed is lower, and hence the lens movement amount during the exposure operation is reduced to a small amount which can be ignored.

Figure 23:
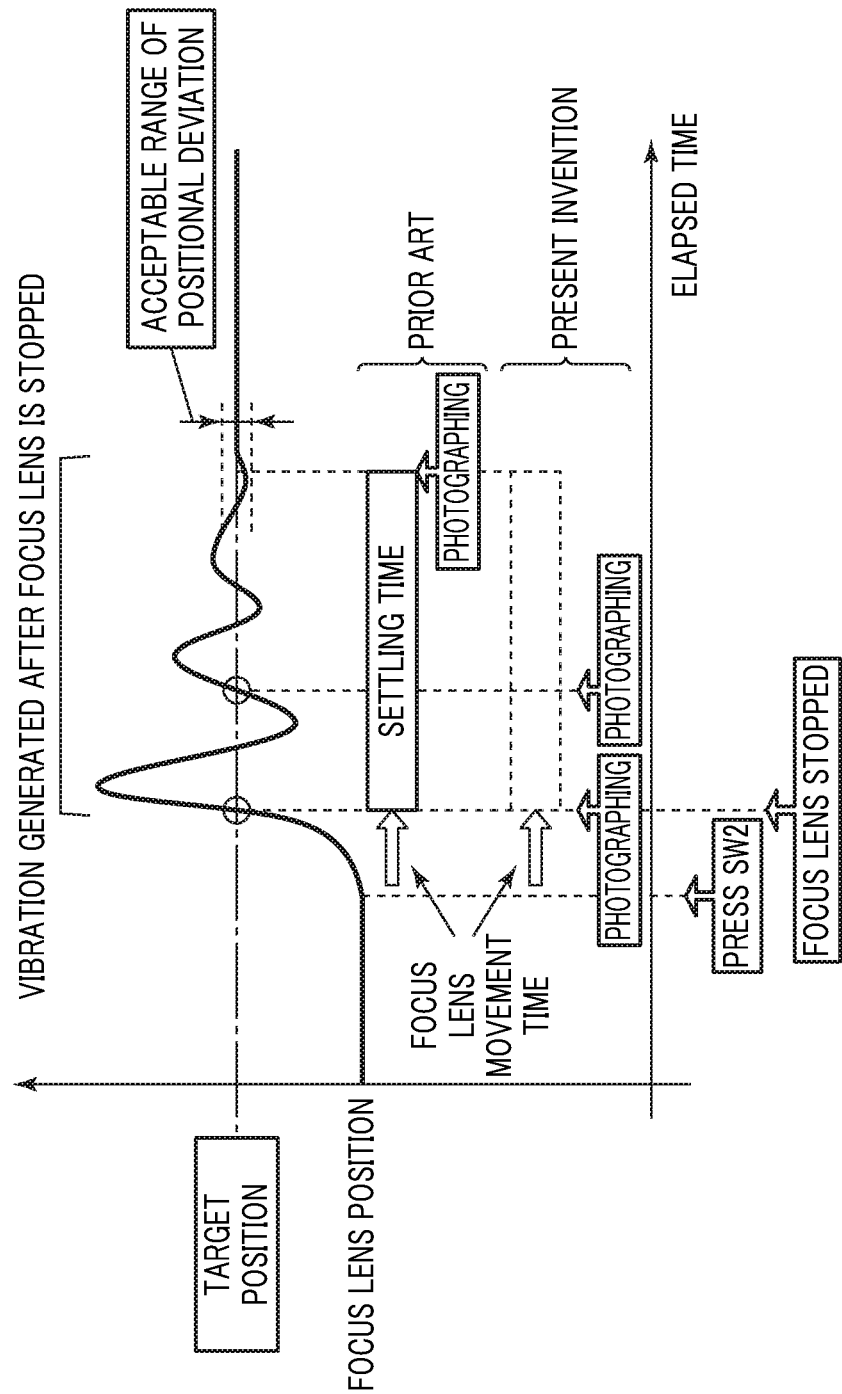
FIG. 23 is a diagram showing a comparison between the conventional photographing sequence and the photographing sequence of the sixth embodiment.

Next, the effect of the present invention, obtained by the present embodiment, will be described with reference to FIG. 23. FIG. 23 is a diagram showing a comparison between the conventional photographing sequence and the photographing sequence of the present embodiment.

In the conventional photographing sequence, photographing is executed by setting the settling time required to accommodate a shake (vibration) of the focus lens 104 which should occur when the focus lens 104 is stopped at the target position after being moved thereto by pressing the switch SW2, within a range of a predetermined amount of positional deviation. In the present invention, it is possible to execute photographing at the elapsed time of 2 msec. or 5 msec. without providing the settling time, and hence eliminate a time lag generated after the switch SW2 is pressed until photographing is started.

Although in the second embodiment, a photographing condition satisfying the condition that the focus correction amount is equal to or smaller than the depth of field is searched for only based on the condition of the aperture value, but may be performed based on the condition of the zoom position. However, if the zoom position is changed, the angle of view is also changed, and hence it is desirable to change the photographing condition of the zoom position in a state in which the same angle of view is maintained by using electronic zoom. Further, the zoom position is changed after the switch SW1 is pressed before the switch SW2 is pressed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-015455 filed Jan. 31, 2018, which is hereby incorporated by reference herein in its entirety.

What is claimed is:

1. An imaging apparatus comprising:
an imaging device that photoelectrically converts an optical image obtained through a focus lens and outputs image signals;
a memory storing instructions; and
a processor that implements the instructions to execute a plurality of tasks, including:
  a focus detecting task that performs focus detection based on the image signals output from the imaging device, in a state where an aperture value is set to a first aperture value;
  a driving task that drives the focus lens to a focus position set according to the focus detection performed by the focus detecting task;
  a first acquiring task that acquires a first correction amount of the set focus position according to a difference between the first aperture value and a second aperture value to be used at a time of photographing;
  a position determining task that determines a focus position at the time of photographing; and
  a controlling task that controls photographing using the determined focus position at the time of photographing, when a user's operation is received,
  wherein the position determining task determines:
    in a case where the first correction amount is larger than a predetermined amount, a focus position corrected according to the first correction amount as the focus position at the time of photographing; and
    in a case where the first correction amount is equal to or smaller than the predetermined amount, the set focus position as the focus position at the time of photographing.

2. The imaging apparatus according to claim 1, wherein the first correction amount is changed according to a photographing condition.

3. The imaging apparatus according to claim 2, wherein the photographing condition is at least one of an object distance, a zoom position, a color, or a luminance of an object.

4. The imaging apparatus according to claim 3, wherein:
the plurality of tasks include an approximating task that performs approximate calculation of an object distance approximate value based on a focus position set according to the focus detection performed by the focus detecting task, and
the object distance approximate value is set to the object distance of the photographing condition.

5. The imaging apparatus according to claim 2, further comprising a storage device that stores a plurality of the first correction amounts according to the photographing condition, and a difference between the first and second aperture values.

6. The imaging apparatus according to claim 5, wherein the plurality of the first correction amounts stored in the storage device are different depending on an individual difference of the imaging apparatus.

7. The imaging apparatus according to claim 5, wherein the plurality of tasks include an adjusting task that performs adjustment corresponding to an individual difference of the imaging apparatus with respect to the plurality of the first correction amounts stored in the storage device.

8. The imaging apparatus according to claim 1, wherein the focus detecting tasks performs focus detection using phase detection based on a phase difference between a pair of object images.

9. The imaging apparatus according to claim 1, wherein:
the plurality of tasks include a searching task that searches for, in a case where the first correction amount is larger than the predetermined amount, a condition under which the first correction amount becomes equal to or smaller than the predetermined amount, and
the condition found by the searching task is set to a condition under which photographing is to be controlled by the controlling task.

10. The imaging apparatus according to claim 9, wherein the condition searched for by the searching task is an aperture value.

11. The imaging apparatus according to claim 10, wherein, among aperture values searched by the searching task for the condition, an aperture value set to the condition under which photographing is to be controlled by the controlling task is an aperture value closest to the first aperture value.

12. The imaging apparatus according to claim 9, wherein the plurality of tasks include notifying task that notifies a list of a plurality of conditions found by the searching task.

13. The imaging apparatus according to claim 12, wherein the plurality of tasks include selecting task that selects one of the conditions on the list as the condition under which photographing is to be controlled by the controlling task, according to a user's instruction.

14. The imaging apparatus according to claim 1, wherein the plurality of tasks includes a holding task that holds a depth of field for each zoom position as the predetermined amount.

15. The imaging apparatus according to claim 1, wherein the position determining:
acquires a second correction amount of the set focus position according to an AF evaluation value acquired when focus detection is performed, in a case where the focus detecting task performs focus detection using contrast detection based on a contrast of an object image;
corrects the determined focus position at the time of photographing according to the second correction amount, in a case where the AF evaluation value is smaller than a threshold value;
does not correct the determined focus position at the time of photographing according to the second correction amount, in a case where the AF evaluation value is equal to or larger than the threshold value.

16. The imaging apparatus according to claim 15, wherein the threshold value is changed according to at least one of a scene determination result, a photographing mode, or a photographing condition.

17. The imaging apparatus according to claim 1, wherein:
the focus detecting task switches to contrast detection based on a contrast of an object image, after performing focus detection using phase detection based on a phase difference between a pair of object images, in the state where the aperture value is set to the first aperture value,
the plurality of tasks include:
an exposure controlling task that controls exposure when the focus detection is performed using the phase detection;
calculating task that calculates the second aperture value based on an output from the imaging device, when the exposure controlling task controls the exposure, and
the focus detecting task, in a case where a difference between the first and second aperture values exists, changes the aperture value to the second aperture value, and performs focus detection again after switching to the contrast detection.

18. A focus adjustment method for an imaging apparatus including an imaging device that photoelectrically converts an optical image obtained through a focus lens and outputs image signals, the method comprising:
performing focus detection based on the image signals output from the imaging device, in a state where an aperture value is set to a first aperture value;
driving the focus lens to a focus position set according to the focus detection;
acquiring a correction amount of the set focus position according to a difference between the first aperture value and a second aperture value to be used at a time of photographing;
determining a focus position at the time of photographing; and
controlling photographing at the determined focus position at the time of photographing, when a user's operation is received,
wherein the determining of the focus position determines:
a focus position corrected according to the correction amount as the focus position at the time of photographing, in a case where the correction amount is larger than a predetermined amount; and
the set focus position as the focus position at the time of photographing, in a case where the correction amount is equal to or smaller than the predetermined amount.

* * * * *